United States Patent [19]
Porter et al.

[11] Patent Number: 5,875,688
[45] Date of Patent: Mar. 2, 1999

[54] PARKING BRAKE MECHANISM AND METHODS OF ASSEMBLY AND OPERATION

[75] Inventors: Curtis Hank Porter, Ortonville; John David Hanson, Bloomfield Hills, both of Mich.

[73] Assignee: Dura Automotive Systems, Inc., Rochester Hills, Mich.

[21] Appl. No.: 709,562

[22] Filed: Nov. 1, 1996

[51] Int. Cl.[6] ............................... G05G 1/14; G05G 5/06
[52] U.S. Cl. ............................ 74/512; 74/540; 74/541; 188/2 D
[58] Field of Search ............................ 74/512, 80, 530, 74/575, 409, 541, 411.5

[56] References Cited

U.S. PATENT DOCUMENTS

| | | | |
|---|---|---|---|
| 4,281,736 | 8/1981 | Lizzio | 180/271 |
| 4,373,402 | 2/1983 | Barrett | 73/862.39 |
| 4,612,823 | 9/1986 | De Leeuw . | |
| 4,753,325 | 6/1988 | Jaksic | 188/2 D |
| 4,846,322 | 7/1989 | Swank | 74/473 R |
| 4,872,368 | 10/1989 | Porter . | |
| 5,309,786 | 5/1994 | Pare . | |

FOREIGN PATENT DOCUMENTS

| | | |
|---|---|---|
| 1 472 392 A | 5/1967 | France . |
| 12032 A | 7/1992 | WIPO . |

*Primary Examiner*—Vinh T. Luong
*Attorney, Agent, or Firm*—D. D. McGraw; Douglas E. Sittler

[57] ABSTRACT

A parking brake operating mechanism having a brake apply pedal arm module and a housing module pivotally mounted on a vehicle. The housing contains a linearly movable toothed rack operatively connected to one end of the pedal arm for movements by that arm and operatively connected at its other end to a front brake cable which is operatively connected to one or more vehicle parking brakes to be tensioned for parking brake application, a pawl member having a pawl tooth selectively engaged with a tooth of the rack to lock the rack in a brake applied position, and a pawl release mechanism which when activated moves the pawl tooth out of engagement with the rack tooth, permitting the rack and the pedal arm to be returned to the parking brake released position by the brake apply tension in the brake cable. A brake lamp switch mounted on the housing is actuated and deactuated by movements of the rack toward the brake applied position and back to the brake release position to energize and deenergize a lamp signifying that the parking brake operating mechanism is in its brake apply mode. Once the pawl tooth is engaged with a rack tooth in locking relation and the operator has released the pedal arm, all reaction to the tension force in the brake cable bypasses the pedal arm, relieving that arm and it pivot from stress from that force while the parking brake remains applied. The pawl release mechanism may be of the spring clutch type or of a pedal arm push-to-release type which is automatically reset upon the completion of the brake release operation so as to be ready upon another parking brake apply to lock the rack, and therefore the brake cable in the applied position.

18 Claims, 9 Drawing Sheets

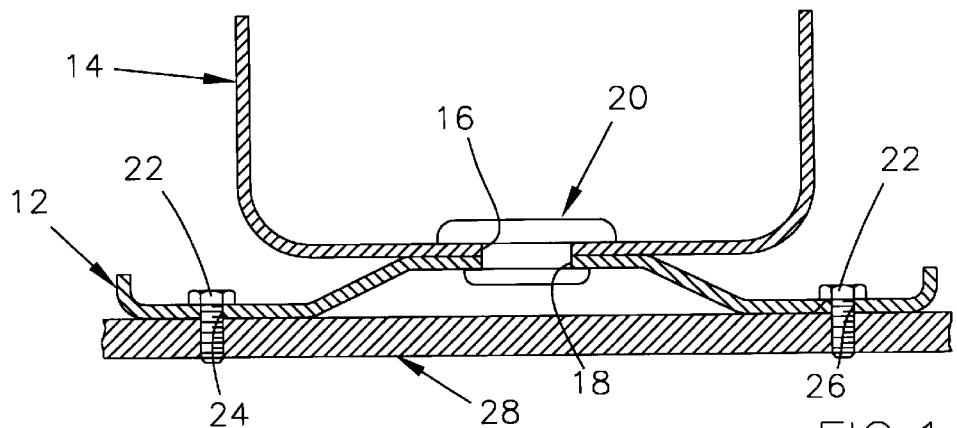
FIG.1a
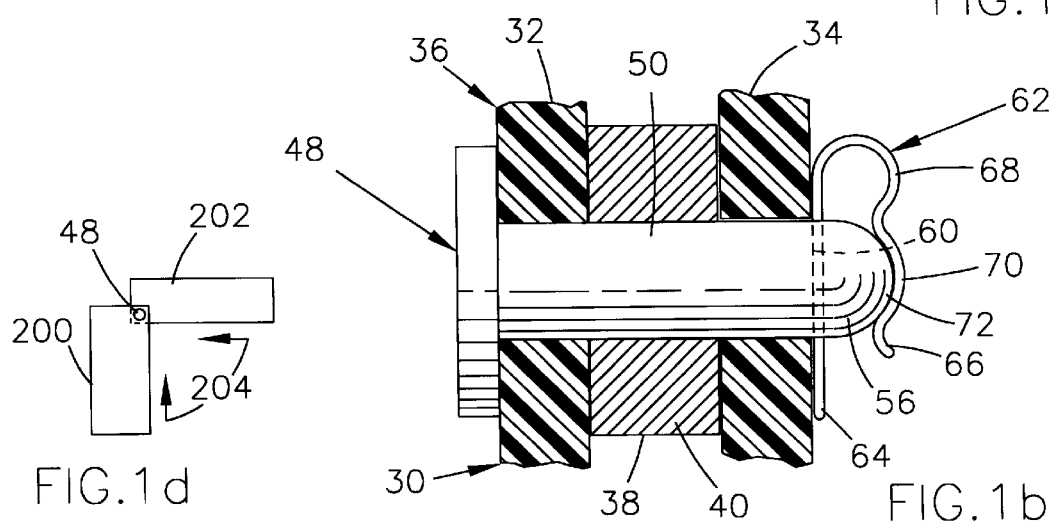
FIG.1d
FIG.1b
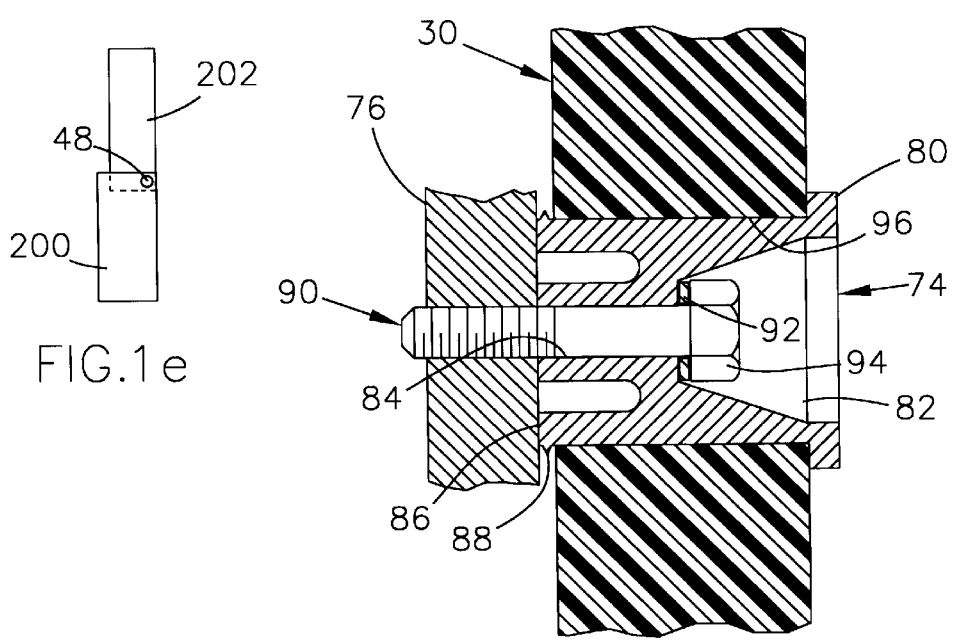
FIG.1e
FIG.1C

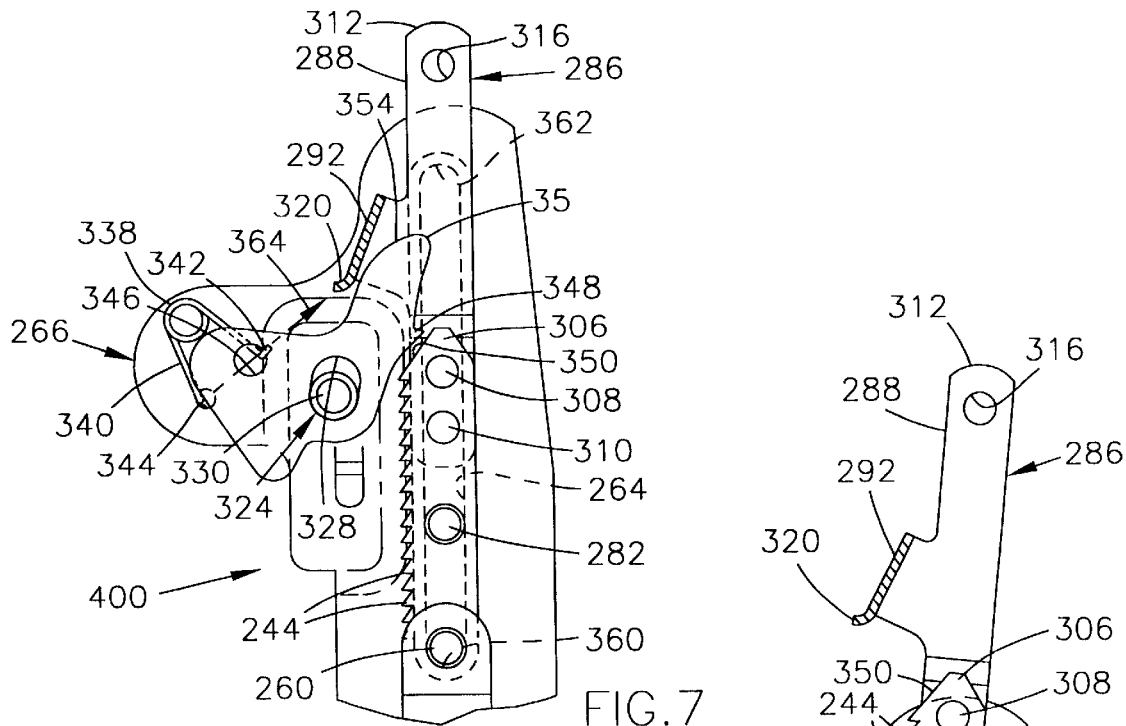
FIG.7
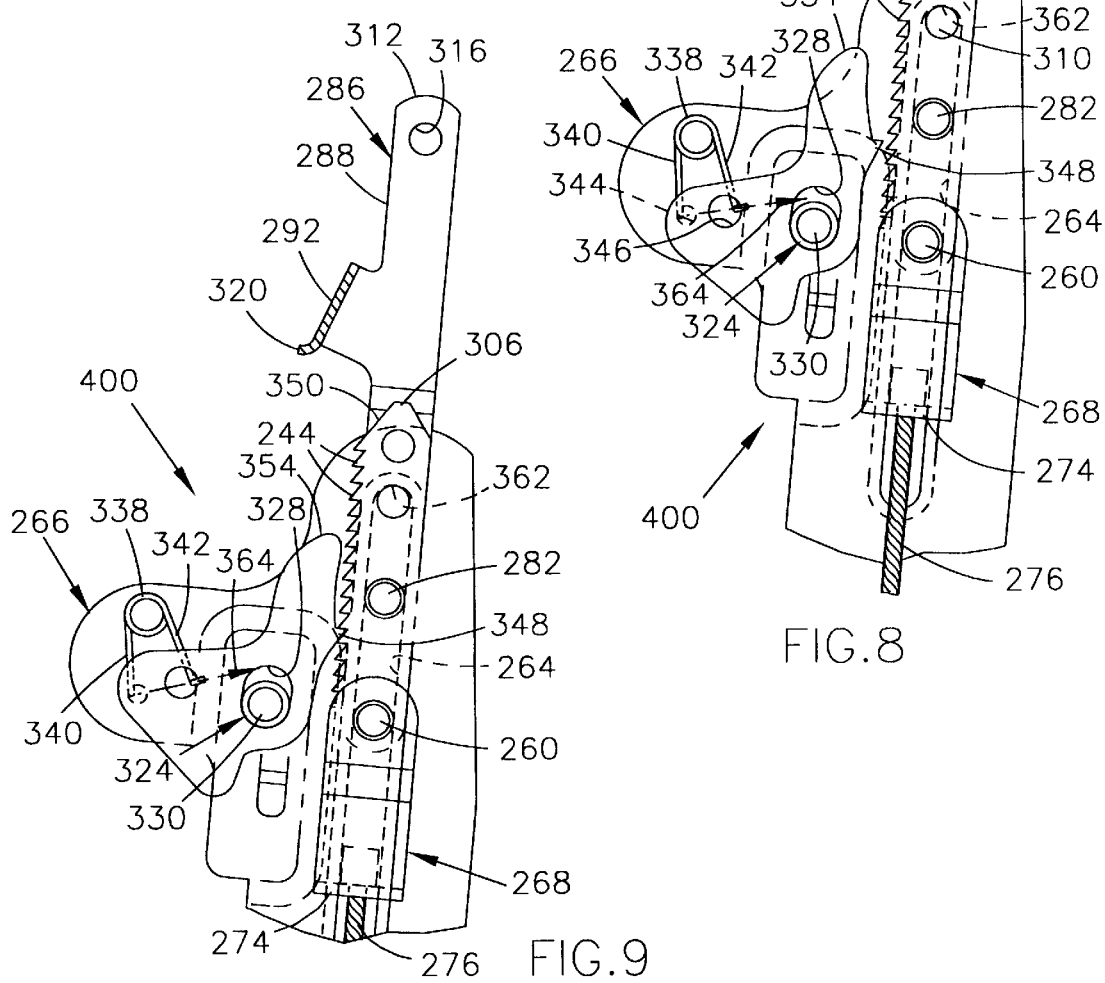
FIG.8
FIG.9

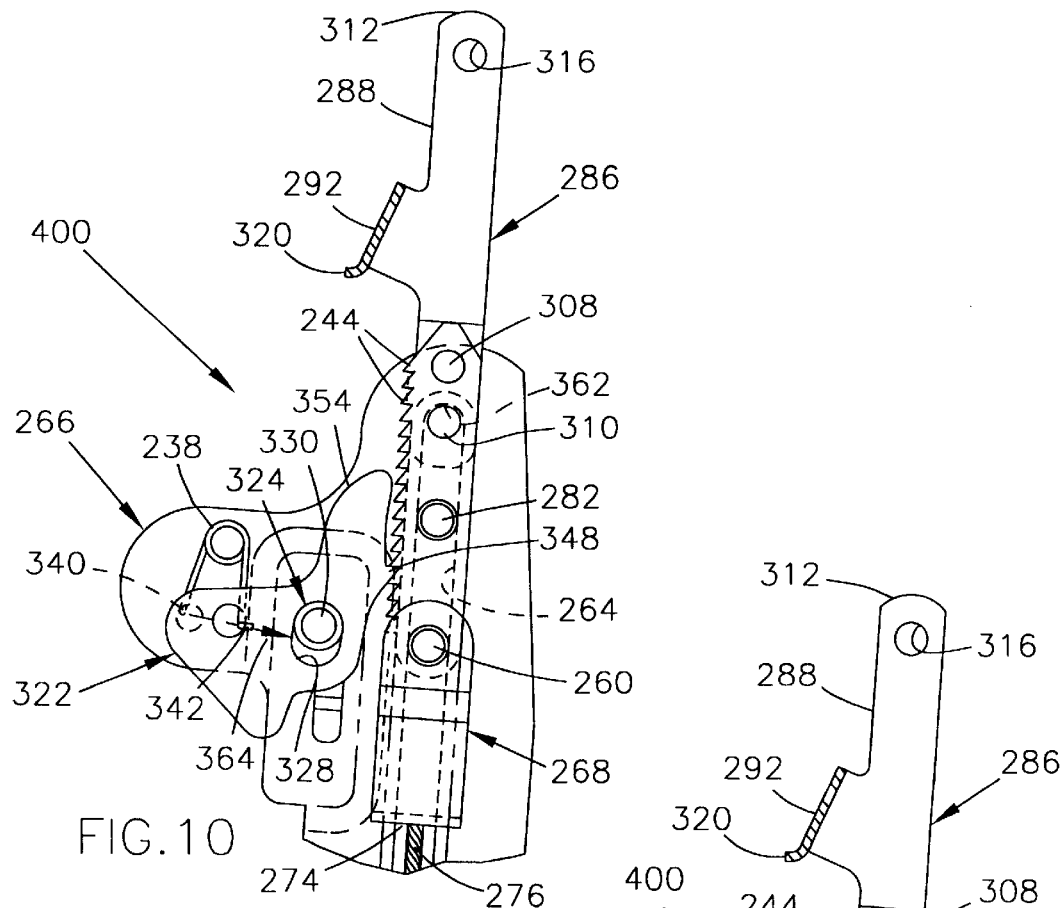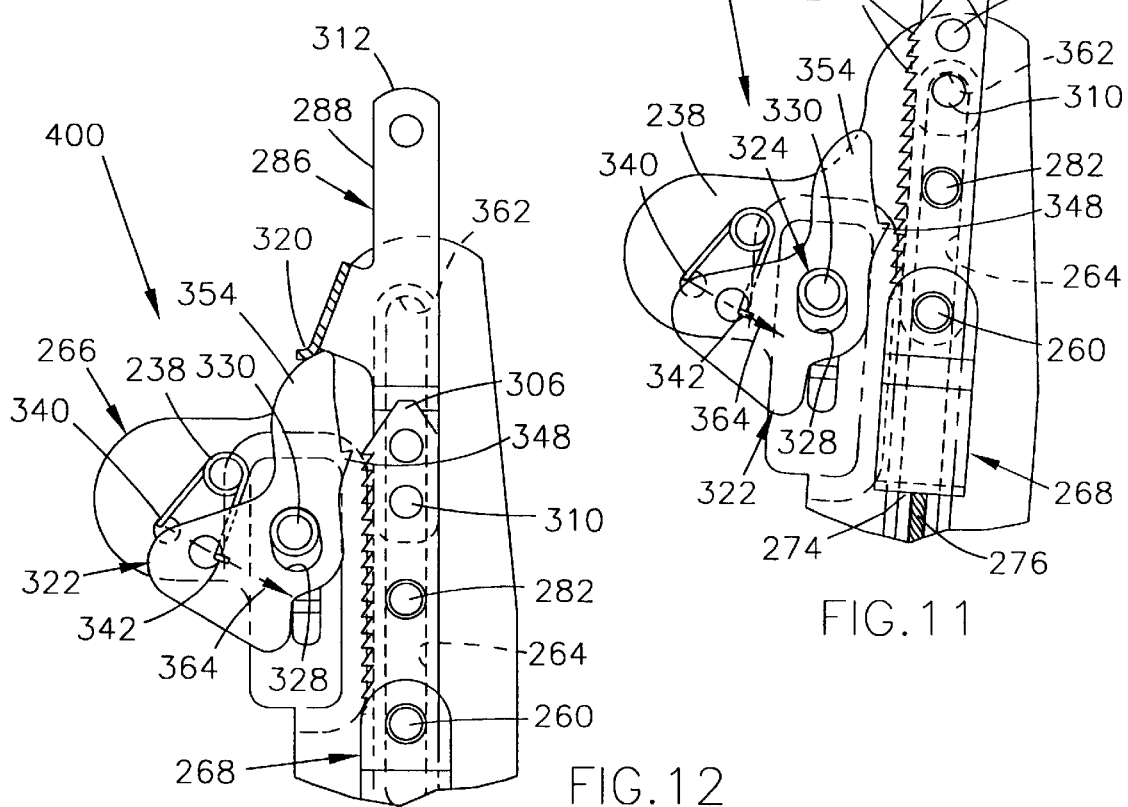

PARKING BRAKE MECHANISM AND METHODS OF ASSEMBLY AND OPERATION

FIELD OF THE INVENTION

The invention relates to a parking brake operating mechanism, a method of assembling that mechanism so as to provide a more efficiently preassembled mechanism to an automobile assembly production line, and a method of operation of the mechanism. It more particularly relates to such a mechanism and method in which the mechanism is a modular assembly which is preassembled at a manufacturing facility and can thereafter be shipped to a vehicle assembly facility and installed on the vehicle without further adjustment of the assembly. The mechanism is preferably operated through a foot pedal lever to apply the parking brake to which the mechanism is operatively attached once it is installed in the vehicle. Upon release of the foot pedal, the mechanism establishes a brake holding force path which bypasses the entire pedal lever, thus relieving that structure from having to continually resist any brake releasing forces transferred to the mechanism from the parking brake assembly, as well as relieving its mounting bearing or bushing from such continuing long-term forces.

The mechanism may be released in either of two manners, namely by use of a release handle or by use of an arrangement in which the foot pedal is again pushed in the apply direction and this action causes release of the holding mechanism and resets the mechanism in preparation for the next parking brake apply.

The pedal lever is pivotally mounted to a mounting bracket and has a toothed rack pivotally secured to its end opposite its foot pedal end. This rack is slidably mounted in a housing, together with a pawl or pinion gear locking mechanism. The parking brake cable is attached to the end of the rack opposite the end of the rack pivotally attached to the foot pedal. The housing is also pivotally mounted on the mounting bracket, thus continually keeping the rack and the brake cable in linear non-binding or side load alignment within the rack housing during parking brake apply and release operations. This eliminates unnecessary side loads on the brake cable and the rack which occurs in an arrangement where the rack moves in a fixed linear path in its fixed housing, but the end of the pedal moves in an arcuate path during its brake apply and release movements. Such incompatible movements have been accommodated by allowing side movements of the rack in its housing, which contribute to wear between the rack and its housing as well as bending loads on the brake cable where it exits the housing.

The pawl or pinion gear locking mechanism, when it locks and thereafter maintains said rack in a brake applied position, transmits all of the force reaction to the parking brake applying tension force exerted by said brake cable to the mounting bracket through the locking mechanism and the housing so that all such force reaction completely bypasses the pivotally movable operating arm and its arm pivot.

Because of these features, the entire mechanism may be manufactured and assembled more easily than prior mechanisms. It does not require some parts to be sufficiently hefty to continually transmit brake holding forces for hours or even days or weeks, saving on weight and materials cost.

BACKGROUND OF THE INVENTION

The typical vehicle parking brake control mechanism has either a hand-pulled or a foot-pushed apply lever which upon movement in a parking brake apply direction by a vehicle operator arcuately rotates a drum or pulley or similar structure, or the opposite end of the apply lever, to which one end of a parking brake cable is attached, exerting tension force through the cable to a brake mechanism located somewhere in the vehicle drive line between the vehicle engine and the vehicle drive wheels. Usually, the vehicle brake mechanism is located at the vehicle wheels on one axle location such as the rear axle. In any case, the tension force in the cable will apply one or more brakes in a parking mode. When applied, the parking brakes strongly resist or prevent movement of the vehicle while it is stopped.

Such vehicle parking brake control mechanisms also have arrangements whereby the brake parking brake cable is held in tension after the hand or foot applied force is removed. These arrangements typically latch or lock the drum or the parking brake lever in position, so that the resistance or reaction force maintaining the brake apply tension force path from the parking brake cable to a fixed part of the vehicle passes from the parking brake cable through the drum to a part of the parking brake operating lever. The drum or the part of the parking brake operating lever acting as such is typically mounted on a pivot shaft or bushing which is mounted on a bracket provided for that purpose, the bracket being operatively fixed to the frame or body of the vehicle.

The latching or locking mechanism of the typical parking brake control mechanism may be any of several basic designs. For example, a toothed gear or gear sector, operatively mounted on or even a part of the drum or the parking brake lever, may be selectively engaged by a toothed pawl which is pivotally or linearly movable into engagement with one or more teeth of the gear or gear sector so as to prevent releasing-direction rotational movement of the drum or the parking brake lever. With the pawl being operatively pivotally mounted on the earlier mentioned mounting bracket, the parking brake force path is transmitted from the gear or gear sector to the vehicle frame or body. In another example, the drum may be latched in the brake-applied position by a spring clutch.

The pawl or the spring clutch is typically released by a hand-operated arrangement which when pulled or pushed causes the pawl or the spring clutch to be moved so as to terminate the latched brake-applied position, relieving the tension in the parking brake cable and permitting the brake or brakes which were applied through it to be released.

The following U.S. Patents are typical of previously known parking brake apply and release mechanisms of the types commonly used on vehicles either currently or at some time in the past, or at least proposed for such use. Some of the patents noted below, while not in such parking brake control mechanisms, have structural features of general interest in developing a fuller understanding of the background of the invention herein disclosed and claimed.

U.S. Pat. No. 210,442—Whipple, patented Dec. 3, 1878, is of interest because it is an early disclosure of a brake operator using a rack and pinion gear for locking the brake in the set position and for releasing the brake. The brake rod which operates the wagon brake is attached directly to the hand operated lever on which the pinion gear is mounted. The pinion gear provides an automatic locking device on the hand operated lever which engages the rack in locking relation when the brake is set by moving the hand operated lever in one pivotal direction. This engagement is terminated by moving the hand operated lever in its disengaging direction, causing the pinion gear to be disengaged from its locking position in relation to the rack and allowing the hand operated lever and the brake rod to be moved to release the wagon brake.

U.S. Pat. No. 1,968,159—Nickliss, patented Jul. 31, 1934, shows a brake operator in which a pinion gear is moved by the lever over a stationary rack. A latch is provided to engage the pinion gear with the teeth of the stationary rack so as to prevent relative movement in the brake releasing direction of the pinion gear relative to the rack, holding the brake in the engaged position until such time as the latch is released to unlock the pinion gear.

U.S. Pat. No. 2,271,799—McCarthy, patented Feb. 3, 1942, discloses a rack and pinion brake actuator which is hand operated so that the parking brake is actuated when the hand lever is pulled. When the hand lever is pulled rearwardly from the housing, the rack is moved a distance regulated by the two pinion gears. The brake cable is attached to the rack so that it is tensioned by such movement of the rack. A clutch or pawl engages one of the pinion gears so as to lock both pinion gears against rotation, thus locking the rack in the brake applied position. The pawl is released by an actuating trigger mechanism which retracts the pawl tooth from engagement with the pinion gear, allowing release of the tension force in the brake cable which was keeping the parking brake applied, releasing the parking brake.

U.S. Pat. No. 2,672,061—Gardner, patented Mar. 16, 1954, also discloses a pinion gear and gear sector brake operator as well as a rack and pinion gear arrangement.

U.S. Pat. No. 3,403,581—Harness, patented Oct. 1, 1968, discloses a toothed rack and two toothed rotatable gears in meshing engagement with it. One of the gears is linearly movable toward and away from the other gear and therefore into and out of meshing engagement with the other gear to lock or release the mechanism. Such a mechanism could be applied to parking brake control mechanisms in which the brake cable is attached to the toothed rack which can be moved toward and from the cable tensioning direction, as shown in U.S. Pat. No. 2,271,799—McCarthy discussed above, 3,459,065—Fender discussed immediately below, or other similar rack and pinion gear arrangements also discussed herein.

U.S. Pat. No. 3,459,065—Fender, patented Aug. 5, 1969, has a pinion gear attached to a hand operated handle. A movable toothed rack engaged by the pinion gear has the brake operating cable attached to it. A toothed wheel on the pinion gear is selectively engaged and disengaged by a pawl. The pawl is biased into the engaged position by a spring and is disengaged by means of a pawl handle which is moved to move the pawl out of engagement with the wheel against the force of the biasing spring. U.S. Pat. No. 3,578,759—Yamazaki, patented May 18, 1971, has a somewhat different arrangement in that the brake is normally applied by depressing the foot operated lever which in turn pulls a cable to cause operation of the brake. A pawl engages a ratchet to hold the brake in the applied position. A rack on a hand operated shaft is engageable with a pinion gear to effect release of the brake when the handle is pushed forwardly.

U.S. Pat. No. 3,961,545—Petresh et al, patented Jun. 8, 1976, illustrates a rack and pinion parking brake actuator which is hand operated. The handle is attached to a toothed rack rod engaged by a pinion gear having a drum or pulley thereon to which the brake cable is attached. Movement of the rack rod causes rotation of the drum or pulley to apply tension to the brake cable. A spring clutch is provided to prevent movement of the drum to a release position until such time as the spring clutch is released by actuation of a release lever.

U.S. Pat. No. 4,793,206—Suzuki, patented Dec. 27, 1988, shows a cable strand attached to one end of a toothed rack which is engaged by a pawl to provide for elimination of excessive slack in the cable.

U.S. Pat. No. 4,850,242—Hass, issued Jul. 25, 1989, has a torsion clutch spring wound about a drum secured to and rotatable with a pedal lever so as to permit movement of the pedal lever to tension a parking brake cable attached to it, but to prevent movement of the pedal lever in the brake releasing direction so long as the clutch spring is in gripping relation with the drum. A pull handle is connected to the free end of the clutch spring which when pulled opens the clutch spring torsionally so that its grip on the drum is eliminated, allowing the pedal lever and the parking brake cable to return to the brake released position. It also discloses a second clutch spring arrangement that is activated when the brake cable is returned to the brake released position to activate a cable tension adjusting device which removes slack in the brake cable. Also, a push-to-release arrangement is shown which includes a toggle pawl and a spring device operable upon tapping of the pedal lever to place the system in a brake released condition.

U.S. Pat. No. 4,872,368—Porter, patented Oct. 10, 1989, has a pawl and ratchet mechanism for locking a parking brake operating mechanism in the brake cable tensioned, brake applied, position. An overcenter spring arrangement alternately pivotally biases the pawl in opposite directions to perform its locking and releasing functions. The pawl is alternately pivoted, first to the locking position when the pedal lever is moved from the released position toward a brake cable tensioning position for applying the parking brake. Once locked, further movement of the pedal lever in the cable tensioning direction causes release of the pawl from the ratchet. Then, alternatively, the pedal lever may be moved further in the cable tensioning direction to again lock the pawl to the ratchet as a higher cable tension force level, or the pedal lever may be released for return to the cable released or off position. Another alternative disclosed is the provision of a manually operable release rod for releasing the pawl from the bracket.

U.S. Pat. No. 4,949,592—Yamazaki et al, patented Aug. 21, 1990, includes a gear sector on a parking brake operating pedal lever, a pawl which is engaged with the gear sector so as to lock that sector against brake releasing movement, and a release linkage for releasing the pawl by operation of a release lever.

U.S. Pat. No. 5,138,899—Katagiri, patented Aug. 18, 1992, shows a pinion and gear sector arrangement wherein the gear sector is formed as part of the parking brake actuating arm. That gear sector is engaged by a pinion gear. The parking brake cable which is tensioned to apply the parking brake is connected to the brake actuating arm. Clutch springs prevent retrograde movement until such time as the release handle is pulled to effect release of the clutches and consequently the release of the parking brake.

U.S. Pat. No. 5,167,166—Ruhlman, patented Dec. 1, 1992, discloses another, later-patented, rack and pinion latching arrangement functionally similar to that of U.S. Pat. No. 3,403,581—Harness discussed above. The rack is connected to a cable. The arrangement is for the purpose of length adjustment, such as taking up excessive slack in the cable.

U.S. Pat. No. 5,170,867—Ojima et al, patented Dec. 15, 1992, shows the employment of torsion clutch springs in a parking brake operator lock and release mechanism, the springs being wound about drum surfaces.

U.S. Pat. No. 5,182,963—Perisho et al, patented Feb. 2, 1993, shows a parking brake pedal lever having a cable drum sector with a cam-shaped surface on the end opposite the pedal to which the parking brake cable is so connected that movement of the pedal lever in the brake applying direction will tension the cable. A gear sector is also on the pedal lever end opposite the pedal. The gear sector is in meshing engagement with a pinion gear which is secured to a clutch drum that is rotatably supported on the parking brake mechanism mounting bracket. A helical clutch spring is wound about and normally grips or releases the drum so as to prevent drum rotation in one direction but to permit drum rotation while the pedal lever is being moved in the brake applying direction. When preventing drum rotation after the pedal lever has been released so that the tension in the brake cable urges the pedal lever (and the drum acting through the pinion gear and gear sector) toward the brake released direction, the mechanism is latched or locked in the brake applied position. A hand operated rod may be moved to act through appropriate linkage to move the free end of the clutch spring so as to open up that spring, causing it to release the drum, and thus permitting brake releasing action of the mechanism.

U.S. Pat. No. 5,309,786—Pare et al, patented May 10, 1994, shows a parking brake actuator having a sector gear mounted on a mounting bracket so as to apply tension to a parking brake cable. A pedal lever is mounted on the mounting bracket for pivoting coaxially with the sector gear but independently of it. A spirally-wound spring extends between the lever and a drive plate for rotating the drive plate relative to the lever to apply an initial tension on the cable. A drive clutch couples the drive plate to the lever upon initial rotation of the lever out of brake release position to enable lever rotation to increasingly tension the brake cable and apply the parking brake. The drive clutch includes a pinion gear mounted on the pedal lever in engagement with the sector gear. A torsion clutch spring is wrapped about the pinion gear hub and has one end fixed to the lever. It has a free end, and normally contracts to prevent rotation of the pinion gear, thus operatively coupling the drive plate to the lever. A release pin on the mounting bracket is engaged by the torsion spring free end in the brake release position to expand the torsion clutch spring to free the pinion for rotation, thus decoupling the drive plate from the lever. Another control clutch has a torsion spring which releasably maintains the drive plate in the brake apply position.

U.S. Pat. No. 5,467,666—Soucie et al, filed Jul. 7, 1994, and patented Nov. 21, 1995, has a non-jamming self-adjust pawl and ratchet mechanism disclosed in an automotive parking brake system environment which is related to the present invention. When the pawl is engaged with the ratchet, it takes the tension load exerted by the tensioned brake cable and transmits it to the mounting bracket which is secured to a fixed part of the vehicle body. It is disclosed with three embodiments. In the first embodiment, the parking brake pedal lever is maintained in the brake-engaged position by a clutch spring and gear drum arrangement and the adjuster pawl is engaged with the ratchet for self-adjust. In the second embodiment, the parking brake pedal lever is maintained in the brake-engaged position by main pawl and main ratchet means, and the adjuster pawl and adjuster ratchet act as before. In the third embodiment, the operating lever is a hand lever that has the adjuster pawl and the main pawl pivotally mounted thereon. Each pawl is engageable with and disengageable from its own ratchet. The mechanism is not mounted in a pivoted housing.

U.S. Pat. No. 5,477,746—Perisho et al, filed Mar. 21, 1994, and patented Dec. 26, 1995, has a pair of cooperating lobe members providing a mechanical advantage between a parking brake operating lever and the parking brake cable. The lobes have cam surfaces connected by a flexible strap or belt that extends between the cooperating cam surfaces and is secured at opposite ends to the respective cams. A spring clutch and drum arrangement is associated with the drive lobe member for locking the lever in the brake applied position. Its free end is moved via a release cable to release the spring clutch's grip on the drum associated with the drive lobe member.

U.S. Pat. No. 5,485,762—Rothman, filed Jun. 20, 1994, and patented Jan. 23, 1996, relates to an adjuster to establish and maintain tension in a cable system. A linearly extending toothed rack ratchet member is engageable by two pawl members, both permitting passage of the ratchet member in the same direction.

Other background relates to the assembly of a parking brake mechanism so that it is in ready-to-ship condition to a vehicle assembly plant, and the installation of a parking brake operating mechanism in a vehicle. It is common practice to ship the parking brake control mechanism of which the hand or pedal lever is an integral part, the control release cable (if one is used) and the front brake cable separately to the assembly plant. Depending upon the sources of these components, they may even be, and often are, shipped from one to three different supplier manufacturing plants. This reduces shipping costs. Even when the conventional system is shipped as a preassembled unit, as is sometimes done, it requires a bulky package for shipping because of its shape as packaged. Of course, the advantage to pre-assembly and shipping as a unit is the reduction in assembly plant labor, which is often at a higher rate than is the labor in many supplier plants.

It is the most common practice to assemble the control and the front cable to each other in an off-line operation at the vehicle assembly plant when the parts noted above are separately shipped. This sub-assembly is then bolted into the vehicle, after which the front cable is threaded through the vehicle bodywork to meet and be attached to the rear brake cable. If a release cable is used, it is typically assembled to the vehicle instrument panel, then led to the parking brake operating mechanism to which it is then attached. The brake adjustment procedure then occurs. This procedure varies widely from one vehicle manufacturer to another, but still must be done.

It is also the usual practice to place a part of the operating lever in the brake tension force path with the parking brake operating mechanism locked in the parking brake applied position, thus keeping that lever, including its pivot, in the brake tension path for the entire period of time that the parking brake is applied, whether it be for hours, days, or even weeks. This requires that the operating lever be relatively bulky and strong, and made of a material to withstand such stress for long periods of time. Even when the operating lever is bypassed after locking, the mechanism does not use less hefty materials and structural elements than are otherwise used, and does not have the locking mechanism in a pivotally mounted housing to reduce side loads.

SUMMARY OF THE INVENTION

The parking brake operating mechanism embodying the invention comprises a pivotable operating lever pivotally mounted on a mounting bracket as an intermediate point of the lever so as to be moved arcuately from a parking brake released position to a parking brake applied position. One end of the lever provides for operator-actuated application of force for applying the parking brake. This is usually a foot-operated pedal on one end of the operating lever. The opposite end of the lever is pivotally attached to a linearly-extending toothed rack which is received in a housing for slidable linear movements therein.

It is a feature of the invention that the rack housing is pivotally mounted on a suitable mounting bracket, which may, but does not necessarily, provide for the pivotal mounting of the operating lever at its intermediate point. In most instances the pivotal mounting of the operating lever is either on a separate mounting bracket or directly on a suitable part of the vehicle bodywork. In either instance, the operating lever is located so that it is readily accessible for operation by the vehicle operator. The rack housing also contains the locking mechanism for locking the parking brake in the brake applied condition, and the releasing mechanism for releasing the locking mechanism so that the parking brake may be returned to the brake released position. It preferably also contains the brake switch which, when actuated, controls the completion of an electrical circuit to energize a signal lamp indicating that the parking brake is applied.

Another feature of the invention is the provision of structural elements for and the method of the establishment of the brake cable tension force load path while the assembly is in the braked applied and locked condition, that load path being from the parking brake cable to the toothed rack to the locking mechanism to the pivotable rack housing to the fixed mounting bracket, bypassing the connection between the brake operating lever and the toothed rack completely so that no part of that tension force load path occurs through the brake operating lever. Effectively, the locking point is moved quite close to the cable conduit fitting within the housing into which the brake cable in the cable conduit extends so that, once the parking brake is locked in the brake applied position, a minimum of material remains under load. This permits the operating lever pivot and bushing to be made with the view that they carry the tension force loads for brief periods occurring only while the parking brake is in the process of being applied and for even shorter periods when the operating lever is moved into the brake applied position to unlock the locking mechanism. They can therefore be made of lighter weight materials, made less bulky, require less machining, and result in less costs.

The invention also has an optional feature wherein an annular bumper is positioned at the end of the rack housing where the brake cable extends out of that housing, providing a shock-absorbing action for the end of the toothed rack as the rack moves quickly in its housing upon release, with such movement being terminated within the housing. By engaging the toothed rack instead of direct structural engagement, there is less wear and tear on the housing, the end of the rack, and the connection of the brake cable to the rack. Another desired result is the diminution of noise upon brake release.

One embodiment of the invention employs a spring clutch and drum with a pinion gear attached to the drum and in meshing toothed engagement with teeth of the linearly-movable toothed rack. The clutch is activated to lock the rack in a desired brake applied position, and is released to permit the tension in the brake cable to return the rack, and the operating arm as well, to the parking brake released position. The entire locking mechanism is contained within the pivotally mounted housing noted above.

Another embodiment of the invention employs a pawl member which has a tooth selectively engaged with a rack tooth to lock the rack in a desired brake applied position, the pawl member being movable by action of the operating arm to disengage the tooth from the rack, permitting the tension in the brake cable to return the rack and the operating arm to the parking brake released position. Movement of the rack to the released position also resets the pawl member in preparation for the next brake apply. The mechanism of this embodiment is also mounted in the pivotally mounted housing noted above.

It is to be understood that the pivot of the housing that is pivotally mounted to a mounting bracket may alternatively be pivotally mounted to a fixed part of the vehicle body or chassis, and the pivot of the brake operating lever or arm may similarly be mounted to a bracket or a suitable fixed part of the vehicle body or chassis. It is within the purview of the invention that the pivotal housing, with the various elements received therein, may be mounted at any of various pivot points within or on the vehicle, and that the brake operating lever or arm may also be mounted at any of various pivot points within or on the vehicle, so long as there is operative connection between the parking brake operating arm and the rack within the housing for vehicle operator-actuation and release, and so long as the brake operating arm end engaged by the vehicle operator for such actuation is positioned so that this engagement and the application of force to the brake operating arm by the vehicle operator is readily and conveniently permitted. Such variations are commonly dictated by design features of the vehicle in which the parking brake operating mechanism is to be installed. Because of the modular arrangement of the housing and its contents, and the modular arrangement of the parking brake operating arm, such mounting arrangements are easily accommodated. When appropriate, the housing and its contents may even be remotely mounted with an intervening structure providing the operative connection between one end of the brake operating arm and the rack end extending outwardly of the housing for such operative connection purposes.

The parking brake operating mechanism embodying the invention is readily adapted for shipping it economically as an assembled unit. The parking brake operating mechanism and the front brake cable are effectively integral since the brake cable is attached to the toothed rack within the rack housing. Because of the arrangement of the various parts and the elimination of any part of the operating lever as a part of the brake cable tension force holding path, that lever (typically and preferably a foot pedal lever) has a reduced size and mass, is relatively slim in profile as compared to current conventional parking brake operators, and consequently reduces shipping costs both as to packaging and freight. Of course, the operating pedal lever could have its pivot bushing preinstalled with the lever being shipped separately, or already attached to the remainder of the brake operator, which is essentially the mounting bracket and the toothed rack end. When the lever is shipped so that it is preattached to the pivot end of the toothed rack, but not to the mounting bracket, it can be swung out around its pivotal connection with the end of the toothed rack until it is substantially in line with the rack housing containing the locking and release mechanism, making a long, straight and relatively slim package for shipping. When installed in the vehicle, or as an off-line operation in the receiving area, it can be easily pivoted back into its final position relative to the rack and the rack housing and be pivotally attached to the mounting bracket.

BRIEF DESCRIPTION OF THE DRAWINGS

FIG. 1a is a fragmentary cross section view taken in the direction of arrows 1a—1a of FIG. 1 and illustrating the installation of the pivot rivet mounting the pivotal rack housing to the fixed mounting bracket but omitted from the showing in that FIGURE as well as being omitted from the showings in FIGS. 2 and 3 for clarity.

FIG. 1b is a fragmentary cross section view taken in the direction of arrows 1b—1b of FIG. 1 and illustrating the installation of the pivot pin securing one end of the brake operating arm to one end of the toothed rack, but having been omitted from the showing in that FIGURE as well having been omitted from the showings in FIGS. 2 and 3 for clarity.

FIG. 1c is a fragmentary cross section view taken in the direction of arrows 1c—1c of FIG. 1 and illustrating the installation of the operating lever pivot bushing which is secured to a suitable mounting bracket or other vehicle bodywork. This structure was also omitted from the showings in FIGS. 1, 2 and 3 for clarity.

FIG. 1d is a schematic representation of the two modules making up the parking brake operating and control mechanism of FIG. 1, showing the normal relationship of those two modules.

FIG. 1e is a schematic representation of the same two modules with one of them having been moved pivotally until the two modules are in substantial longitudinal alignment, making a long, straight and relatively slim package for shipping.

FIG. 4a is a schematic representation of the two modules making up the parking brake operating and control mechanism of FIGS. 3–12, showing the normal relationship of those two modules.

FIG. 4b is a schematic representation of the same two modules with one of them having been moved pivotally until the two modules are in substantial longitudinal alignment, making a long, straight and relatively slim package for shipping.

FIGS. 7 through 12 show the rack locking and release mechanism components, located in or immediately adjacent the rack housing of FIGS. 3, 4, 5 and 6, in the full progression of steps from the parking brake off condition through the reset condition. The view shown in each of these FIGURES is taken in the general direction of arrows 7—7 of FIG. 3, with the elements illustrated in this FIGURE being in their fully assembled relation rather than in the exploded view relation of FIG. 3.

More specifically, FIG. 7 shows the components with the parking brake operating and control mechanism off but ready to be applied;

FIG. 8 shows the components in an early stage of vehicle parking brake apply;

FIG. 9 shows the components in an intermediate stage of vehicle parking brake apply;

FIG. 10 shows the components in the completed stage of vehicle parking brake apply with the parking brake operating mechanism locked in the applied position;

FIG. 11 shows the components in the parking brake release stage; and

FIG. 12 shows the components in the process of being reset to the condition shown in FIG. 7 after the vehicle parking brake release stage has been completed.

DETAILED DESCRIPTION OF THE ILLUSTRATED EMBODIMENTS

The parking brake operating and control mechanism 10 shown in FIGS. 1, 1a, 1b, 1c and 2 includes a mounting bracket 12 suitably secured in fixed relation to a part of the vehicle bodywork, usually underneath the dash end on the vehicle side where the steering wheel is located. In left-hand drive vehicles commonly used in the United States of America and many other countries, this would be the left end of the dash.

Figure 1:
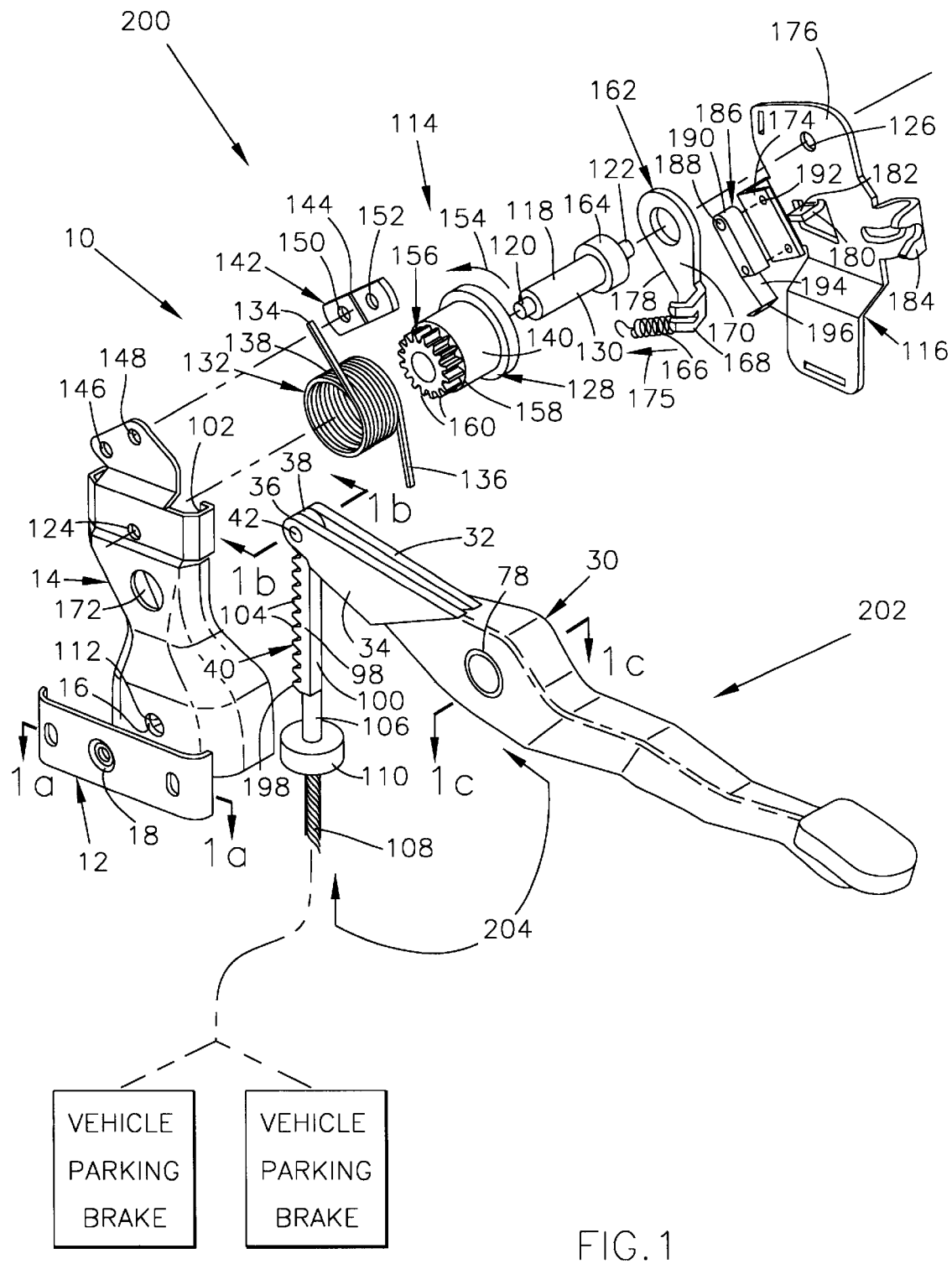
FIG. 1 is an exploded view of a somewhat schematic representation of a parking brake operating and control mechanism showing one embodiment of the invention. Some parts are omitted for clarity.

The housing 14 is provided with an aperture 16 which is in axial alignment with another aperture 18 in the mounting bracket 12. A pivot rivet 20, shown in cross section in FIGURE 1a but omitted in FIGS. 1 and 2 for clarity, secures the housing 14 to the mounting bracket 12 in pivotal relation. Instead of a rivet, a stud or bolt may be used to provide the element on which housing 14 is pivotally mounted on the mounting bracket 10. FIG. 1a also shows mounting bolts 22 which extend through apertures 24 and 26 in the mounting bracket 12 and are fastened to the vehicle bodywork 28.

FIG. 1b shows the rack eye end 38, portions of the operating lever 30, those portions being the two webs 32 and 34 forming the end 36 of the operating lever, and a retaining device. Webs 32 and 34 are spaced apart in parallel plane relation so as to receive the eye end 38 of the toothed rack 40 between them. Axially aligned apertures 42 and 44 are respectively formed in webs 32 and 34, and aperture 46 is formed in the rack eye end 38. Aperture 46 is axially aligned with apertures 42 and 44 with the rack eye end 38 being received in the space between the webs 32 and 34.

The retaining device includes a headed pin 48 which has a cylindrical body section 50 which extends through apertures 42, 44 and 46 so that its head 52 engages the outer side surface 54 of web 32 and its end 56 opposite its head 52 extends outwardly of aperture 44 beyond the outer side surface 58 of web 34. A through cross passage 60 is formed near the pin end 56 so that it is immediately beyond the web outer side surface 58 when the pin head 52 is in engagement with the web outer side surface 54.

The retaining device further includes a generally U-shaped self-retaining wire clip 62 which has its straight leg 64 extending through passage 60 and a curved leg 66 joining leg 64 by a reversely bent section 68. The curved leg 66 has a recess-like portion 70 which may be received about the end surface 72 of pin 48 so that the clip 62 grips the portion of the pin axially between passage 48 and end surface 72 so that the clip is held in place on pin 48. This functions best when the portion 70 is flattened and then formed as a shallow socket of greater lateral width than the diameter of the wire of which the clip is made. Of course, the clip when made of a substantially constant diameter wire may be turned approximately 90° from the position shown in FIG. 1b, and its recess-like portion 70, being of wire of the same shape as the legs of the clip, will similarly fit about an arcuate part of the circumference of the pin body 50 in a plane passing through passage 60 and substantially parallel to the web outer surface 58, and still be retained in place on pin 48.

As the end 36 of the operating lever 30 moves arcuately during brake apply and brake release operations, a pivoting action takes place about the axis of pin 48 between the toothed rack 40 and the operating lever 30. The angle formed by the operating lever 30 and the toothed rack 40 decreases during brake apply and increases during brake release. The extremes of that angle are readily seen in comparing the positions of the operating lever and the toothed rack in FIGS. 4 and 5, described in detail below.

FIG. 1c shows the detail of the pivot bushing 74 for the operating lever 30. Bushing 74 is shown as being secured to a mounting bracket 76 which is in turn secured to another portion (not shown here) of the vehicle bodywork 28. Bushing 74 extends through the aperture 78 in the intermediate portion of the operating lever 30. It has a flanged end 80 which has a center recess 82 opening into a passage 84 extending axially through the bushing. Passage 84 opens through the side 86 of the bushing, which at its outer circumference has a retaining lip 88. A headed bolt or screw 90 extends through passage 84 with its captive lock washer 92 and its head 94 seated at the inner base of recess 82 and its other end threaded through the mounting bracket 76. Bushing 74 is therefore fixedly supported on the mounting bracket 76 by bolt or screw 90, and the intermediate portion of the operating arm having aperture 78 is in arcuately rotatable engagement with the cylindrical side bearing surface 96 of bushing 74.

Toothed rack 40 has a base 98 extending the length of the rack. The surface 100 on one side of base 98 is received in a channel guide 102 formed as a part of housing 14. Guide 102 retains and guides rack 40 within the housing as the rack moves linearly. The base 98 of the rack engages the bottom and side surfaces of the channel guide 102. A series of linearly spaced rack teeth 104 are formed as a part of rack 40 and extend outwardly from the base in the opposite direction from base surface 100. The end 106 of rack 40 opposite its eye end 38 has one end of the front brake cable strand 108 secured to it so as to transmit brake applying tension forces to that cable strand and, through other cables or linkage as may be appropriate, to the brake or brakes to be activated as a parking brake for the vehicle. A rebound bumper 110, illustrated as an annular cylindrical device made of resilient material, is received about rack end 106. When the rack is in position in the housing 14, cable strand 108 extends through its conduit end fitting which is secured to the housing 14 through hole 112. This conduit end fitting is of common construction, and is not shown for clarity. When the rack is so installed, rebound bumper 110 has its end nearer the cable strand 108 in engageable relation with the surface of the inner part of housing 14 immediately surrounding hole 112. Bumper 110 functions to dampen any sudden downward movement of the rack 40 as it reaches its brake released position within housing 14 as the parking brake locking mechanism to be described is released after a parking brake apply.

A clutch lock and release mechanism 114 is received in the upper end of housing 14 and is covered by the housing cover plate 116. This mechanism includes a clutch drum axle 118 having end sections 120 and 122 which, when assembled in housing 14 and covered by cover plate 116, respectively extend through openings 124 of housing 14 and 126 of cover plate 116. Axle 118 may be secured to the housing 14 in the manner of a rivet, or may be press fitted into opening 124. It is preferably also so secured into opening 126 to discourage disassembly of the housing by removal of the cover plate. However, it may not be so secured into opening 126 if it is desired to permit removal of the cover plate 116 if needed. Because it is always fixedly secured at least to housing 14, it does not rotate relative to that housing or cover plate 116.

Clutch lock and release mechanism 114 also includes a drum 128 which is rotatably received on the section 130 of axle 118 adjacent the axle end 120. A torsion clutch coil spring 132 having ends 134 and 136 has its coiled portion 138 intermediate its ends 134 and 136 wound about the surface 140 of drum 128 so that it normally grips the drum surface 140. Spring end 134 is anchored to housing 14 by anchor plate 142, which has a slot 144 receiving that spring end. Anchor plate 142 is secured to housing 14 by suitable bolts or screws, not shown for clarity, which extend through respectively aligned openings 146 and 148 of housing 14 and 150 and 152 of anchor plate 142.

Spring 132 is so wound that it acts as a one-way clutch, permitting rotation of the drum in the direction of arrow 154, which corresponds to brake applying movement of the operating lever 30 and the toothed rack 40, as will be further described. It acts as a locking clutch, however, when the drum is urged toward rotation in the direction opposite to that of arrow 154 until it is released by moving its free end 136 in a direction which slightly uncoils the spring coiled portion 138, also as further described.

Figure 2:
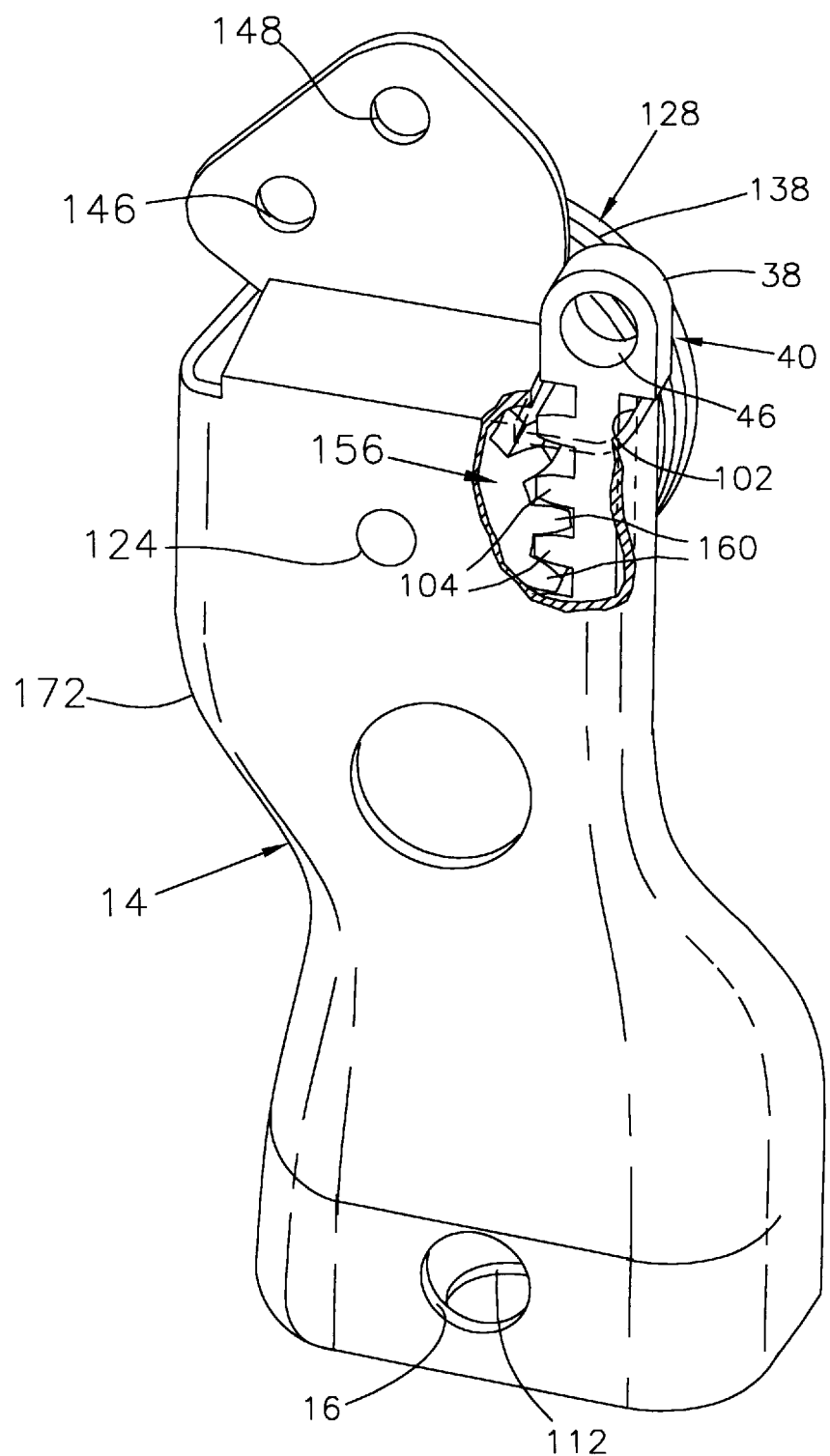
FIG. 2 is a somewhat schematic perspective view of the pivotally mounted rack housing which contains all of the control elements of the mechanism embodying the invention shown in FIG. 1, illustrated in assembled condition with parts broken away for clarity. Some parts are also omitted for clarity.

A pinion gear 156 is either formed on or secured to the end 158 of drum 128. Teeth 160 of gear 156 mesh with the rack teeth 104 when assembled in the housing 14 and cover plate 116 so that linear movement of the rack 40 is translated into rotary movement of the gear 156 and drum 128. As seen in FIGS. 1 and 2, upward movement of rack 40 will cause rotation of the gear and the drum in the direction of arrow 154 and downward movement of the rack will rotate them in the opposite rotational direction. Of course, this latter movement is prevented by the torsion clutch spring's grip on the drum surface 140 so long as the clutch is not released.

Mechanism 114 also includes a clutch release lever 162 which is rotatably received on the axle section 164. A clutch release lever return coil spring 166 has one end secured to the end 168 of the arm portion 170 of lever 162. The other end of spring 166 is attached to the inner portion of housing flange 172 so that the spring is in tension and urges the lever 162 in a clockwise direction as indicated by arrow 175. Lever 162 is located immediately adjacent the cover inner surface 176 and its side 178 is normally in engagement with the side surface 180 of the tab stop 182, being continually urged into such engagement by the tension force of spring 166. The arm end 168 of lever 162 is bifurcated to receive a release cable with a button end, the cable being routed through the slotted arm 184 of cover plate 116. This is also a commonly used arrangement for providing a cable attachment to arcuately move a rotatable lever, and is not illustrated in detail for clarity.

When assembled in the housing 14 and cover plate 116, the lever arm end 168 is positioned to engage the free end 136 of the torsion clutch coil spring 132 and to move that spring end in a direction which slightly unwinds the coiled portion 138 of spring 132 when the release cable assembly is tensioned, causing the clutch spring 132 to release its grip on drum surface 140. Once released, the drum is rotated by the tension force of the parking brake being released, exerted through cable strand 108, pulling the rack 40 downwardly to drive the pinion gear 156 and drum 128 in the rotatable direction opposite to that indicated by arrow 154. Since this release from a full brake apply is sudden, the rack 40 moves very quickly downwardly as seen in FIG. 1 until the rebound bumper 110 engages the housing 14 as earlier described, damping the stop so that lesser stresses occur between the housing and the rack than would otherwise occur without the rebound bumper. It is to be understood that the rebound bumper may be secured to the bottom of the housing 14 so that it surrounds the hole 112 through which the cable strand passes, yet is shock-absorbably engageable by the end 106 of the rack 40 when that rack is returned to the parking brake released position.

A parking brake switch assembly 186 is also mounted within housing 14 and cover plate 116. This assembly is mounted to the flange 174 of cover plate 116 by suitable means such as a screw extending through a passage 188 in the switch housing 190 and threaded into opening 192 in flange 174. The switch activation arm 194 is so positioned that, when the rack 40 is in the brake released position, its end 196 is normally engaged by the rack end tooth 198 and holds the switch in its open position until the parking brake apply mode is initiated. Since the switch 186, when it its arm 196 is disengaged, is closed, and when its arm is engaged, is open, the default position of switch 186 is when it is closed. Only by the outside influence of the arm 196 being engaged by the rack end tooth 198 is the switch in its other position. Since rack 40 moves upwardly as seen in FIG. 1 upon such initiation, rack tooth 198 moves upwardly so that the switch activation arm end 196 moves further rightward as seen in FIG. 1 so that it approaches the reduced-area rack end 106. This movement is sufficient to allow the contacts of the switch assembly 186 to close, energizing a parking brake light on the vehicle instrument panel indicating that the parking brake is applied. Switch assembly 186 is preferably wired through the vehicle ignition switch so that it can energize the parking brake light only while the ignition switch is on.

FIGS. 3 through 12 show a modification 210 of the parking brake operating and control mechanism 10 of FIGS. 1 through 2 in which a brake locking pawl is set in the locking position when the parking brake is applied. This pawl holds the parking brake cable in tension after the parking brake operating arm is released. It is also released by pushing on the pedal end of the parking brake operating arm in a brake applying direction, and is reset for locking action when the next parking brake apply occurs.

In the embodiment of FIGS. 1–2, the parking brake operating mechanism 10 is considered to be made up of two modules 200 and 202. The first module 200 includes housing 14 containing the apply, locking and release mechanism 114, and the brake cable 108. Mechanism 114 is essentially all of the elements shown in FIG. 1 except for bracket 12, operating lever 30, and cable 108. The second module 202 is the parking brake operating lever 30.

Figure 3:
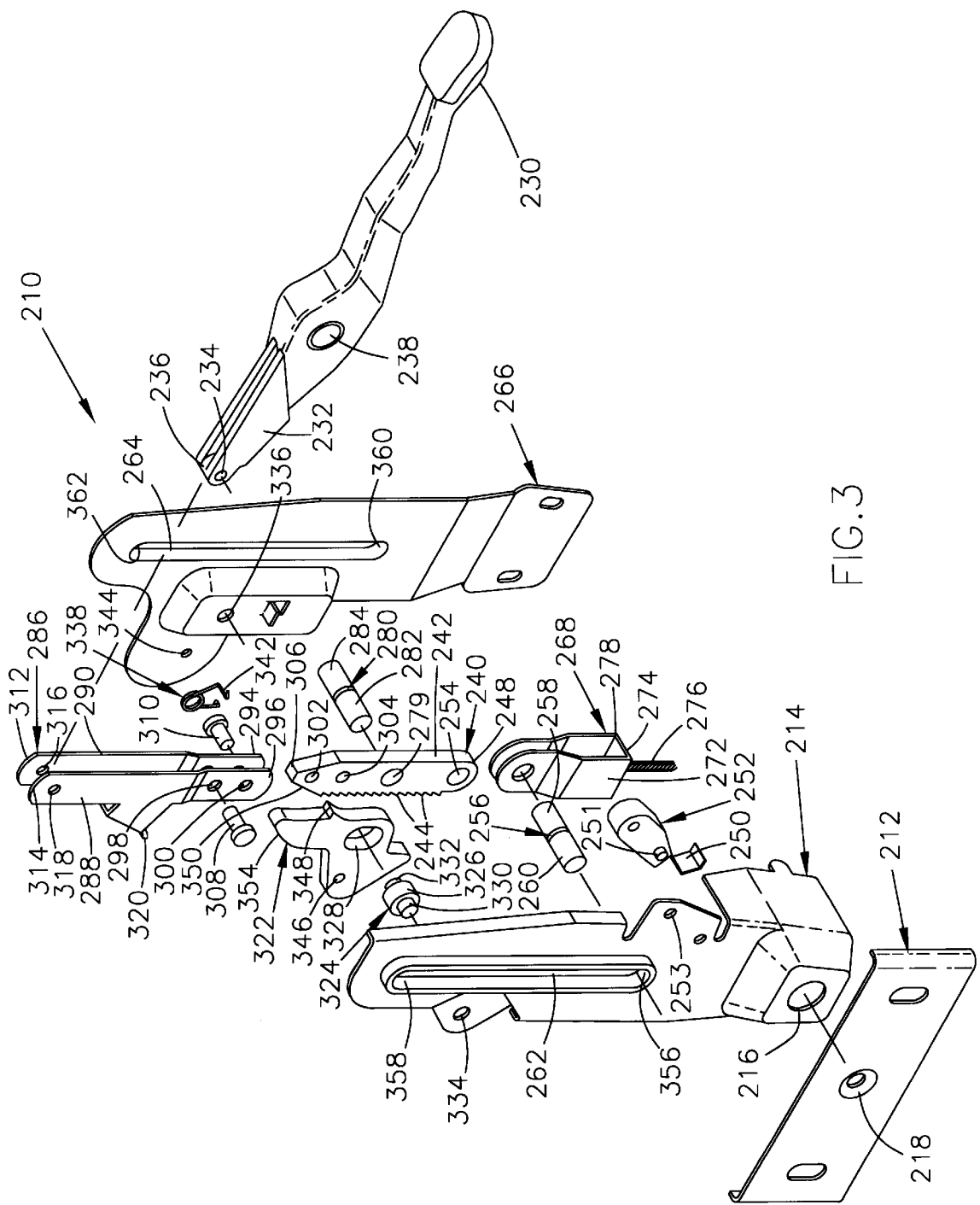
FIG. 3 is an exploded view of another somewhat schematic representation of another parking brake operating and control mechanism showing a modified embodiment of the invention. Some parts are omitted for clarity.

FIG. 3 shows the modified parking brake mechanism 210 in exploded view. Mounting bracket 212 is secured to a vehicle body part so that it is fixed relative to the movable parts of the parking brake operating and control mechanism 210. The housing 214 is provided with an aperture 216 which is in axial alignment with another aperture 218 in the mounting bracket 212. A pivot rivet such as pivot rivet 20, shown in cross section in FIGURE 1a, secures the housing 214 to the mounting bracket 212 in pivotal relation. Instead of a rivet, a stud or bolt may be used to provide the element on which housing 214 is pivotally mounted on the mounting bracket 210.

The parking brake operating lever 230 has a web 232 formed on one end of it in which an aperture 234 is formed in the end 236 of web 232. Another aperture 238 is formed in the intermediate portion of the operating lever 230. The operating lever 230 is pivotally mounted on a bushing secured to a suitable mounting bracket or vehicle body part, not shown, in a manner much like that of operating lever 30 of FIGS. 1 through 2.

Toothed rack 240 has a linear base 242 on one side and, on the opposite side, has a linear series of ratchet teeth 244. Rack end 248 has an aperture 254 through which a stud-like pin 256 is press fitted so that the ends 258 and 260 of that pin are received in linearly extending guide slots 262 and 264 respectively formed in housing 214 and cover plate 266. A generally U-shaped clevis 268 has its apertured sides 270 and 272 pivotally fitted over the pin ends 258 and 260 so that the clevis may move pivotally about the pin 256. The center portion 274 of the clevis is slotted so as to receive the button end (not shown) of the front brake cable 276 in a well-known manner, permitting the tension forces of brake application and release exerted through the cable to be transmitted between the rack 240 and the cable 276. As can be better seen in FIGS. 4 and 5, the center portion 274 of the clevis 268 is selectively engaged and disengaged by the actuating arm 250 of brake switch 252 so that the switch is either open or closed, in a similar manner to that described above in detail with reference to switch 186 and its arm 196 of FIG. 1. It is clear that the default position of switch 252 (and its arm 250), occurring while the parking brake control mechanism is in the parking brake released position, is that shown in FIG. 4, in which the switch is closed. The switch is moved to its other, open, position when t is engaged by the clevis 268, and particularly its center portion 274, as above described. Switch 252 is mounted on housing 214 by means of a bolt or screw, not shown, extending through the switch housing passage 251 and the hole 253 in the housing 214.

Rack 240 has another aperture 279 through which another stud-like pin 280 like pin 256 is similarly press fitted so that the ends 282 and 284 of that pin are also received in linearly extending guide slots 262 and 264 of housing 214 and cover plate 266. Therefore, pins 256 and 280, being guided in slots 262 and 264, limit the movements of the rack 240 to those allowed by the slots.

A rack extension 286 comprises parallel legs 288 and 290 joined by a middle portion 292. The respective ends 294 and 296 of these legs each have a pair of linearly spaced apertures 298 and 300 which, when assembled, are in alignment with similar apertures 302 and 304 formed in rack 240 in linearly spaced relation and located near the end 306 of rack 240. Rivet 308 is received through apertures 298 and 302, and rivet 310 is received through apertures 300 and 304 so that rack extension 286 is firmly secured to the rack end 306 and becomes essentially a part of the rack 240. The other respective ends 312 and 314 of legs 288 and 290 have respective apertures 316 and 318 formed therein so as to be aligned with aperture 234 of the web end 236 of the operating lever 230. A pin (not shown) of the type shown in FIG. 1b is inserted through apertures 316, 234 and 318 and secured in place by a clip as shown in that FIGURE so that pivotal movements are permitted between the rack extension 286 and the web end of the operating arm 230. The middle portion 292 of rack extension 286 is at an acute angle relative to the direction of extension of legs 288 and 290, the portion further removed from those legs being near the leg apertures 298. That portion has a tab 320 formed thereon whose function as a cam driver will be later described.

A pawl member 322 is mounted on an axle pin 324, that pin having a center portion 326 received in elongated aperture 328 of pawl member 322 so that the pawl member can pivot about the pin and can also move laterally relative to the pin. Pin 324 also has opposite ends 330 and 332 which are of smaller diameter than its center portion 326 and are received in openings 334 and 336 respectively of housing 214 and cover plate 266. The pin end 330, after being assembled into opening 334, may be expanded with a riveting procedure so that it is secured to the housing 214. An overcenter spring 338 has hooked ends 340 and 342 which are respectively in opening 344 of cover plate 266 and opening 346 of pawl member 322. Pawl member 322 also has a pawl tooth 348 which in the assembled condition is positioned to engage two adjacent teeth 244 of the rack 240 to lock the rack against linear movement within housing 214, and to be disengaged from the teeth 244 of the rack 240 so as to release the rack. The end 352 of pawl member 322 has a curved cam surface 354 which is selectively engaged by tab 320 as will be described below. The various positions of the pawl member and its associated elements are shown in S sequence in FIGS. 7 through 12.

Figure 4:
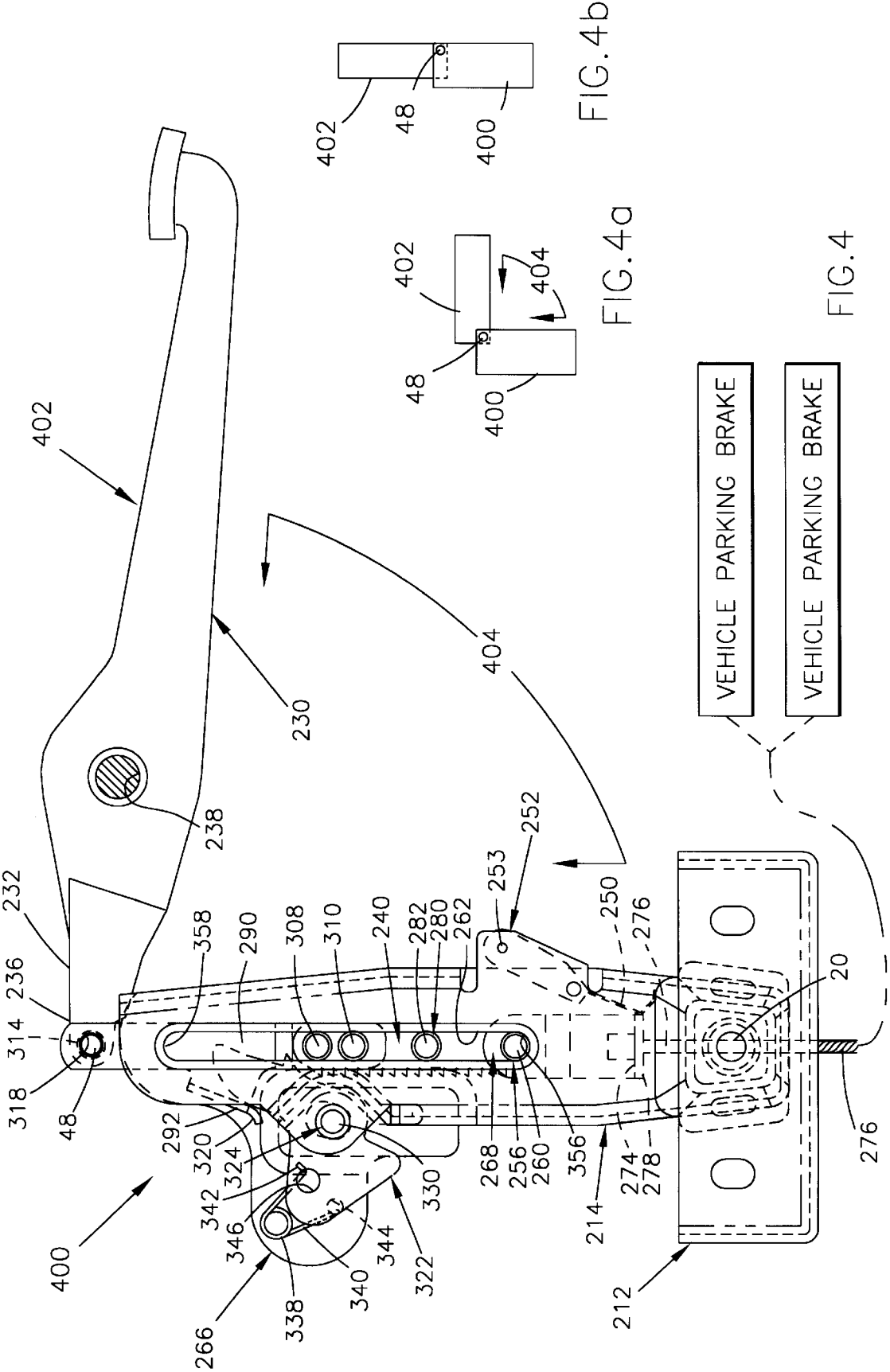
FIG. 4 is an elevation view of the parking brake operating and control mechanism of FIG. 3 showing parts of the interior of the rack housing of that mechanism. The mechanism is in the brake released position with parts being in phantom (dashed lines) and other parts having been broken away to provide an unobstructed view of certain elements.

FIG. 4 shows the released position of the parking brake operating and control mechanism 210 of FIG. 3, with the pawl 322 and its overcenter spring 338 having been returned to the reset position. Pin end 260 is at the bottom end 356 of slot 262, as is pin end 284 in the cover plate slot 264 (but not seen in this FIGURE). The clevis center section 274 is in engagement with the switch arm 250, keeping switch 252 open. The operating arm 230 is in its raised position and is available to the vehicle operator's foot to move that arm clockwise as seen in FIG. 4. The pawl tooth 348 is located above the uppermost tooth of the rack teeth 244 so that it engages the surface 350 of the double-beveled end 306 of the rack 240, and therefore does not have any locking engagement with those teeth. The overcenter spring 338 is exerting a force on the pawl member 322 which tends to hold that member in the position shown. The direction of that force is shown in FIG. 7 by arrow 364, FIG. 7 also showing certain elements of the mechanism 210 in the parking brake released position as described below.

Figure 5:
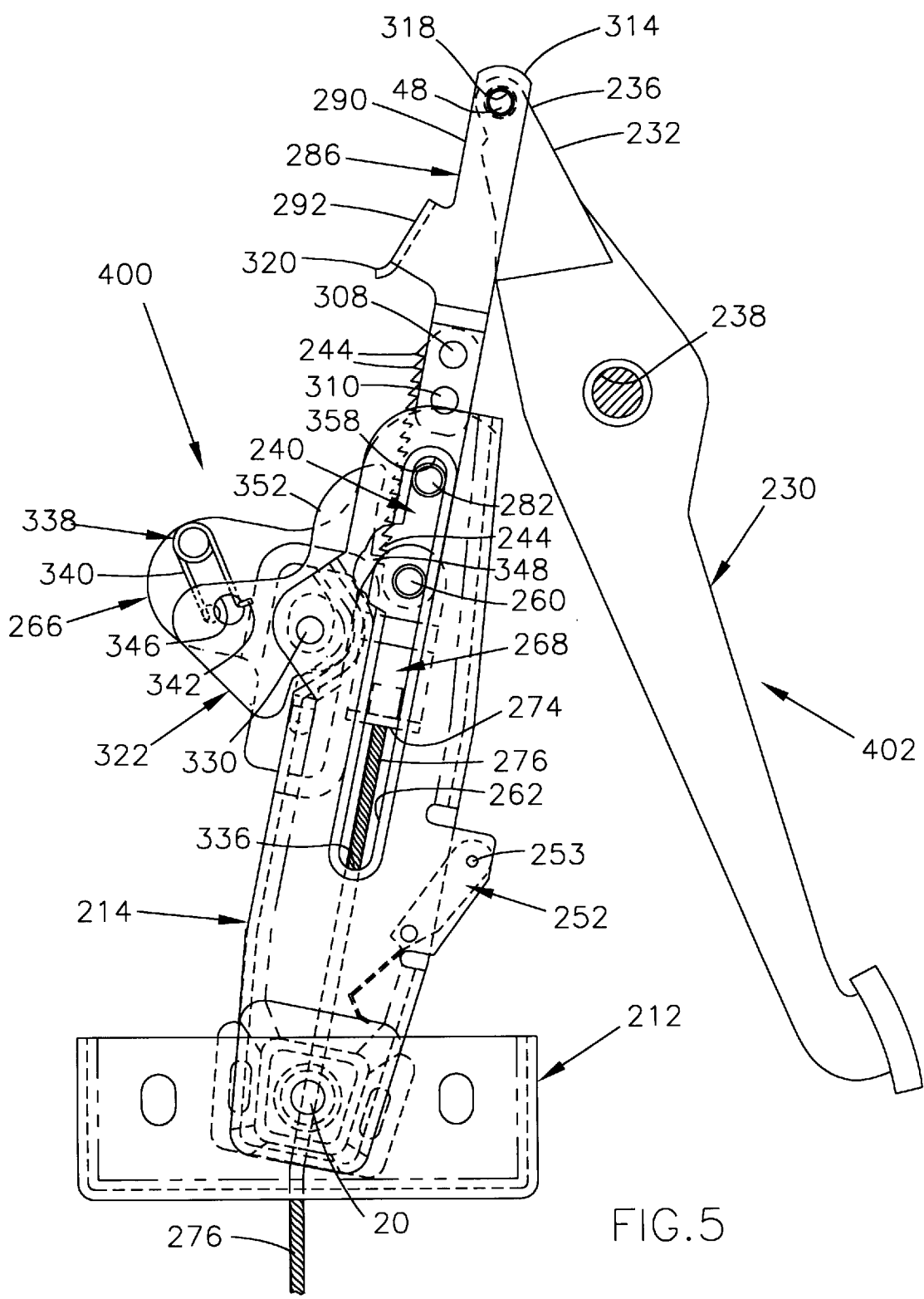
FIG. 5 is a view similar to that of FIG. 4, but with the mechanism locked in the brake applied position with the pedal operating arm at the maximum limit of its brake application travel. Parts are shown in phantom (dashed lines) and other parts have been broken away to provide an unobstructed view of certain elements.

In FIG. 5, the same elements of the parking brake operating and control mechanism 210 are shown as in FIG. 4, but the mechanism 210 is now in the maximum parking brake apply position, the operating arm 230 having been moved clockwise from its released position shown in FIG. 4 to its maximum travel position. The housing 214 has moved arcuately clockwise about its pivot rivet 20 so as to accommodate the movement of the pin 48 and the ends 236 of the operating arm and 314 of the rack extension leg 290 in an arcuate path about the axis of the bushing received in operating arm opening 238. Pawl tooth 348 is engaged in locking relation with one of the rack teeth 244 near the lower end 248 of the rack 240, holding the rack and the rack extension 286 in their most extended position relative to housing 214. The pin end 282 is near the upper end 358 of slot 262, as is pin end 284 in the cover plate slot 264 (but not seen in this FIGURE). The front brake cable 276 is under maximum brake apply tension, and the parking brake at the vehicle wheel or elsewhere is applied. The disclosure of FIG. 5 is closely related to the view shown in FIG. 10 described in greater detail below.

Figure 6:
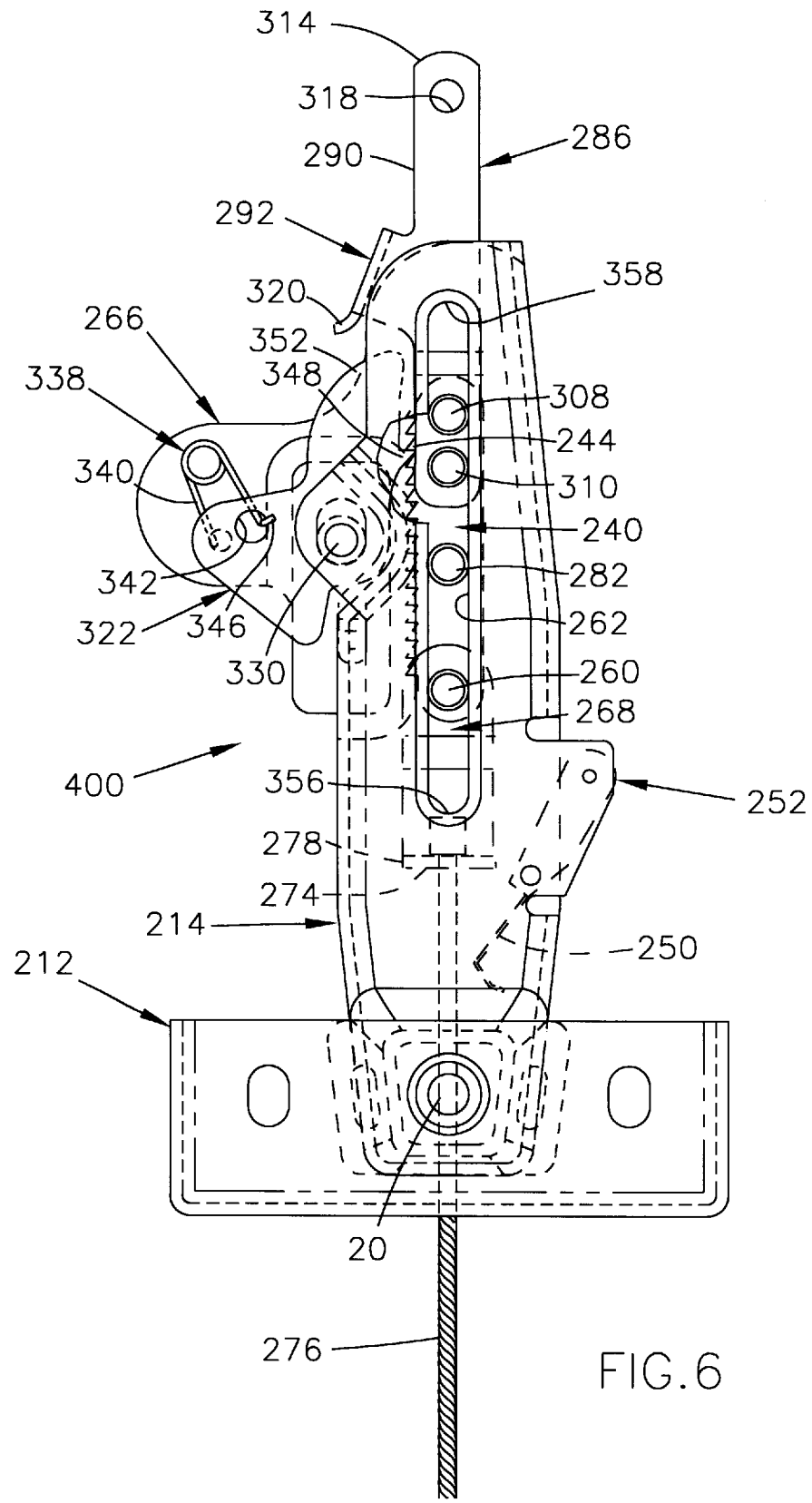
FIG. 6 is similar to that of FIG. 4, but showing only the rack housing and its interior components, as well as its mounting bracket, the interior components being in the condition where parking brake apply has been initiated.

FIG. 6 is similar to FIG. 5, but shows the parking brake operating and control mechanism of that FIGURE in and immediately adjacent to housing 214 in a first stage brake applied position. It is substantially the same position as that shown in FIG. 8 described below, which also illustrates the mechanism 210's first stage of parking brake apply.

FIG. 7 shows the mechanism 210 as if the housing 214 were totally transparent so that the inner elements of the housing are seen against the background of the cover plate 266. Also, the plane of the cross section indicated by arrows 7—7 in FIG. 3 passes between and parallel to the rack extension legs 288 and 290 so that only leg 288 is seen. However, it shows the rack 240, pin ends 260 and 282, rivets 308 and 310, axle pin 324, overcenter spring 338, pawl member 322, and axle pin end 330 in elevation. The cover plate 266 with its slot 264 is shown. The upper end 362 of slot 264 is also shown in this FIGURE as well as FIGS. 8 through 12. The bottom slot end 360 of slot 264 is not shown in these figures since the bottom part of the mechanism 210 is broken away and not shown. Overcenter spring 338 exerts a force on the pawl member 322 in the direction of arrow 364. Thus the axle pin 324 is in the leftward end of elongated aperture 328 as seen in this FIGURE, and pawl tooth 348 engages surface 350 of the end 306 of rack 240.

FIG. 8 is similar to FIG. 7 and is a view taken in the same plane as is FIG. 7. However, FIG. 8 shows the elements in an early stage of apply in which the toothed rack 240 is still moving in the parking brake apply direction, which is rightward as seen in each of FIGS. 7 through 12. Therefore, the pawl tooth 348 is shown as ratcheting over each tooth 244 as each such tooth moves rightwardly relative to that pawl tooth. The overcenter spring 338 is exerting a force on pawl member 322 in the direction of arrow 364, which direction in FIG. 8 is more nearly perpendicular to rack 240 than is arrow 364 as shown in FIG. 7. However, the axle pin 324 is still in the leftward end of elongated aperture 328.

FIG. 9 is similar to FIG. 8, with the pawl tooth 348 having moved into potentially locking engagement with one of the ratchet teeth 244, and also in engagement with the next adjacent tooth in such manner that pawl tooth 348 would ratchet over that next adjacent tooth if the rack were moved further rightwardly.

FIG. 10 is similar to FIG. 9, showing the arrow 364 as now exerting its force on pawl member 322 on the opposite side of the axis of axle pin 324 than it was in FIGS. 7, 8 and 9, having passed over center. This force has caused the pawl member 322 to move laterally leftward so that the axle pin 324 now is located in the rightward end of elongated slot 328. However, this direction of spring force does not remove the pawl tooth 348 from locking engagement with the one tooth of rack teeth 244 because it cannot overcome the much heavier locking load on tooth 348 so as to move that tooth out of engagement with the two adjacent rack teeth.

FIG. 11 shows the parking brake operating and control mechanism components of FIGS. 7, 8, 9 and 10 when the rack 240 has been moved slightly rightward by the vehicle operator having applied a push-to-release force to the pedal of the operating arm 230. Once the pawl tooth is no longer loaded with the tension force exerted through the rack 240 from the front brake cable 276, the spring action of overcenter spring 338 acting in the direction of arrow 364 in FIG. 11 pivots the pawl member 322 in a counter-clockwise direction about axle pin 324, lifting pawl tooth 348 outward of the teeth 244 so that it is no longer in locking or lockable engagement with any of those teeth. At this point, illustrated in FIG. 11, the rack 240 and the rack extension 286 will move leftwardly as seen in that FIGURE.

FIG. 12 shows the pawl member 322 in the process of being reset into the released position shown in FIGS. 4 and 7. The tab 320 is in engagement with the cam surface 354 of pawl member end 352 while rack 240 is moving leftwardly, driving that pawl member end and pawl tooth 348 clockwise against the force of overcenter spring 338 acting in the direction of arrow 364, causing the pawl tooth 348 to engage the surface 350 of the rack end 306. This forces the elongated slot 328 in pawl member 322 to move arcuately about axle pin 324 until the rightward end of slot 328 is further removed from the rack 240 in the plane of the pawl member 322, causing the slot to be moved relative to the axle pin so that effectively the axle pin is now back in the same position as shown in FIG. 7, and the spring 338 has moved over center and returned to the position shown in FIG. 7. Once again, arrow 364, as shown in FIG. 7, indicates the direction of the spring force applied to the pawl member. Thus the pawl member and the entire locking mechanism is reset and ready for the next parking brake apply and the locking of the rack 240 in the parking brake applied position.

In summary for the disclosure of FIGS. 3 through 12, the parking brake lock and release mechanism, which includes the pawl member 322 pivoted on axle pin 324 received through the pawl member's elongated aperture 328, the axle pin being mounted in the housing 214 of which cover plate 266 is a part. The pawl member 322 has a pawl tooth 348 which is selectively movable into and out of locking engagement with one of the teeth 244 of the toothed rack 240. While it also engages the next adjacent tooth, the part of that tooth is slanted so that such engagement is a ratcheting or sliding engagement and not a locking engagement. Thus, the locking engagement is only with the one tooth 244 having a vertical tooth face so that it will lock against the pawl tooth 348. This locking engagement prevents the toothed rack 240 from moving in the parking brake release direction in the housing 214.

The pawl member 322 is urged so as to be movable about the pin axle 324 by the overcenter spring 338, which has its one hooked end 340 extending through opening 344 of the cover plate 266, which, when secured to housing 214, is a part of the entire pivotal housing in combination with housing 214. The other hooked end 342 of overcenter spring 338 extends through opening 346 formed in the pawl member 322. In the released and resetting condition shown in FIG. 12, the pawl tooth 348 is approaching engagement with the beveled surface 350 of the toothed rack upper end 306.

When the parking brake application is begun, movement of the operating lever arm 230 causes the toothed rack to move rightwardly in housing 214 as seen in FIGS. 8 and 9, with the pawl tooth 348 ratcheting over some of the teeth 244 as shown in FIG. 8, until the desired amount of parking brake application has been attained by increasing the tension in brake cable 276. The position of the pawl member 322 is then in the position shown in FIG. 9, still being urged downwardly by the force of overcenter spring 338 as indicated by the direction of arrow 364 in FIG. 9 into full locking engagement with the rack tooth 244 to its immediate right as seen in this FIGURE. The vehicle operator has moved the pedal of the operating arm 230 to achieve this situation, but has not yet released that arm.

The vehicle operator then removes his parking brake applying force from the operating lever arm so that such vehicle operator force no longer urges the toothed rack 240 rightwardly as seen in FIG. 9. The pawl tooth 348 then takes the full load of the parking brake application reaction force exerted from the brake cable 276 through the rack 240. This force causes the pawl member 322 to move leftwardly from the position shown in FIG. 9 to the position shown in FIG. 10. As shown, the pin axle 324 is now located in the rightward end of the elongated aperture 328 rather than in its leftward end. This moves the overcenter spring over center to its position shown in FIG. 10 so that its force shown by arrow 364 in that FIGURE now acts on the pawl member 322 tending to rotate that member counterclockwise about pin axle 324 as viewed in FIG. 10. This force does not move the pawl tooth from locking engagement with the tooth 244 with which it is lockingly engaged, because the locking force is such that the force of spring 338 cannot overcome it and rotate the pawl member 322. The pawl member and its tooth 348 and spring 338 are therefore conditioned for release of the rack.

To release the pawl tooth 348 from the rack tooth, the vehicle operator reengages the pedal end of the operating arm 230 and pushes on it, taking up most of the reaction force being carried by the tooth 348, pawl member 322, the housing defined by cover plate 266 and housing 214 and the mounting bracket 212. This concurrently decreases the locking action of the pawl tooth 348 on the rack tooth 244 to the point where spring 338, acting in the direction of arrow 364 of FIGS. 10 and 11, disengaging the pawl tooth 348 from the rack teeth and moving it completely out of the linear path of movement of these rack teeth to the position shown in FIG. 11. Thus, the rack has been released.

The vehicle operator then removes his pedal force from the pedal end of the operating lever 230 and the tension in the brake cable 276 pulls the rack 240 leftwardly as seen in FIG. 11 to the position shown in FIG. 12. Tab or cam driver 320 then engages the curved cam surface 354 of the pawl member end 352. The cable tension continues to move the rack 240 leftwardly so that tab 320 drives the cam surface 354, and therefore the pawl member end 352, in a clockwise movement about axle pin 324, approaching the position of the pawl member shown in FIG. 7. At a point in this clockwise rotation of the pawl member 322 about axle pin 324, the spring 338 is once again forced over center, this time from the position shown in FIG. 12 to the position shown in FIG. 7. Pawl tooth 348 again engages the bevel surface 350 of the rack upper end 306 under the force of overcenter spring 338 as shown by arrow 363 in FIG. 7. The lock and release mechanism is once again set in condition for locking the toothed rack at the end of another brake apply operation.

In order to assure the provision of proper antecedent basis for various terms used in the claims and/or this specification, the following is provided:

The parking brake apply and release mechanism 10 of FIGS. 1–2 and the parking brake apply and release mechanism 210 of FIGS. 3–12 are each also described or referred to in this specification and/or are recited in one or more claims using various terms which are applicable to either or both of the mechanisms 10 and 210. These terms, which may be used in either the singular or the plural, include the following terms and/or similar other terms: parking brake operating mechanism; parking brake apply and release operating mechanism; a more efficiently assembled mechanism; mechanism 10; mechanism 210; parking brake holding mechanism; entire mechanism; parking brake control mechanism; and parking brake operating and control mechanism.

The parking brake operating arm 30 of FIGS. 1–2 and the parking brake operating arm 230 of FIGS. 3–12 are each also described or referred to in this specification and/or are recited in one or more claims using various terms which are applicable to either or both of the arms 30 and 230. These terms, which may be used in either the singular or the plural, include the following terms and/or similar other terms: operating lever; arm having an intermediately positioned pivot; pivotally movable operating arm; parking brake activating arm; brake activating arm; brake operating lever or arm; brake operating arm; pedal operating arm; pedal arm; hand-pulled or foot pedal apply lever; and operating lever.

The term "guide means" is a generic term for two different guide mechanisms or arrangements, and is applicable to either one, or to both, depending upon the additional detailed terms used in the claims. Therefore, in one or more claims "guide means" refers to the channel guide 102 of FIGS. 1–2 with its bottom and side walls. The term "guide means" in one or more claims refers to the guide arrangement including pin 256; its ends 258 and 260; and guide slots 262 and 264 of FIGS. 3–12. When the term "guide means" is used in a generic sense it refers to the channel guide and equally to the guide arrangement noted immediately above. These terms are described or referred to in this specification and/or are recited in one or more claims using various terms which are applicable to either or both of the guide of FIGS. 1–2 or the above-identified guide arrangement of FIGS. 3–12. These terms, and/or other similar terms, may be used in either the singular or the plural.

The term "vehicle parking brake" and similar terms refers to a brake, usually at a vehicle wheel, but at times located elsewhere in the drive train, which, when activated by a parking brake operating mechanism, resists movements of a vehicle in which it is installed. The vehicle parking brake forms no part of the invention herein disclosed and claimed, but is mentioned at various times to provide a useful understanding as to the function and structural connection which is ultimately to be controlled, because it is the mechanism that is controlled by the parking brake operating mechanism. 42

A vehicle parking brake is well-known to have a fully released position at one point of its operation and a fully applied position at the opposite point of its operation as a parking brake. It may be lightly applied to obtain only light parking brake effectiveness, or any intermediate condition of application which attains any greater parking brake effectiveness to a brake applied position at which the fullest attainable parking brake effectiveness is attained. Consequently, when "a brake applied position" used in relation to the rack 40 or 240, it therefore means a position of that rack that attains "a brake applied position" of the parking brake, which may be any brake applied position of the parking brake operating mechanism which is commensurate with the initial attainment of the lightest parking brake application to the parking brake applied position commensurate with the attainment of the fullest attainable parking brake effectiveness. "A brake applied position" of rack 40 or 240 therefore may be a position of such rack within the housing 14 or 214 that has attained a parking brake application resulting in light parking brake effectiveness, or a rack position within the housing 14 or 214 that has attained a parking brake application resulting in any greater parking brake effectiveness. In its broadest sense it is simply any position of a brake control structure in which the brake controlled by that structure is applied because of the attainment of that position by the brake control structure. The rack 40 or 240 in each instance is such a brake control structure.

The term "substantially at the rack other end" takes its context from the showing in the drawings, and may be considered to be immediately adjacent to the rack other end to the extent shown in the drawings. This differentiates from being at or near the midpoint of the rack, or from being at or immediately adjacent to the rack one end. Any question of the limitations on the use of the phrase including the words "substantially at" are immediately answered clearly by reference to the drawings. That is precisely why each feature claimed must be shown in the drawings, and this feature is clearly so shown so as to provide sufficient definiteness.

In the embodiment of FIGS. 3–12, the parking brake operating mechanism 210 is considered to be made up of two modules 400 and 402. The first module 400 includes housing 214 containing the apply, locking and release mechanism, and the brake cable 276. The major components of the apply, locking and release mechanism are toothed rack 240, brake switch 252, pin 256, cover plate 266, pin 280, rack extension 286, pawl member 322, axle pin 324, and overcenter spring 338. Essentially, module 400 comprises all of the elements shown in FIG. 3 excluding the bracket 212 and the operating lever 230. The second module 402 is the parking brake operating lever 230. Modules 400 and 402 are schematically illustrated in FIGS. 4a and 4b, joined at the pivot 48. FIG. 4a shows the normal relative positions of the two modules when they are being installed in a vechicle, and after installation in their relative parking brake released positions.

The conventional parking brake operating and control mechanism which includes some type of housing with various elements therein or thereon, and the parking brake operating lever, is shipped as a unit with the operating lever in its parking brake released position similar that schematically shown in FIGS 1d and 4a so that it extends laterally from the remainder of the mechanism, much like the illustration in FIG. 1 or FIG. 4, where it appears to be substantially perpendicular to the modules 200 or 400. When such a unit is placed in a package with this configuration, it leaves considerable dead space taken up by the arcuate space 204 or 404 subtended between the modules 200 and 202 or 400 and 402, space 204 being shown in FIGS. 1 and 1a by an arcuate arrow 204, and space 404 being shown in FIGS. 4 and 4a by an arcuate arrow 404. However, by providing the two modules 200 and 202 or 400 and 402, in the arrangement of the invention the second module may be moved about pin 48 (FIGS. 1–2) or, in the arrangement of FIGS. 3–12, a pin 48 (not shown in FIG. 3, but shown in FIGS. 4 and 5) of the type shown in FIG. 1b. This movement is from the schematic position shown in FIGS. 1d and 4a to the schematic position shown in FIGS. 1e and 4b, providing a straight, relatively thin package which is then more economically shipped. The package eliminates the dead space 204 or 404 which would remain if conventional parking brake operating mechanisms were being shipped.

We claim:

1. A parking brake apply and release operating mechanism for a vehicle parking brake, said mechanism comprising:

21 a mounting bracket;

a pivotally movable operating arm having an arm pivot intermediately positioned thereon and about which said operating arm is selectively moved pivotally in either arcuate direction, said operating arm further having one arm end adapted for the application of parking brake applying force by a vehicle operator by pivotal movement of said operating arm about said arm pivot in one of said arcuate directions;

a housing mounted on said mounting bracket for pivotal movement;

a toothed rack linearly slidable in and guided by guide means formed as a part of said housing and having rack ends;

said pivotally movable operating arm having another arm end opposite said one arm end operatively attached to one of said rack ends for transmitting parking brake apply force from said pivotally movable operating arm to said rack, said operating arm another arm end moving through an arc during pivotal movements of said pivotally movable operating arm with said rack moving linearly in said housing, said housing pivoting on said mounting bracket so as to maintain linear alignment of said rack with said pivotally movable operating arm other arm end while accommodating the arcuate movements of said pivotally movable operating arm other arm end with a minimum of side load from said rack to said housing, said rack having its other rack end operatively connected to a brake cable adapted to be connected to transmit parking brake application tension force to a vehicle parking brake when the brake applying force applied to said operating arm one arm end causes movement of said rack to apply parking brake applying tension to said brake cable, means for locking said rack in a brake applied position when said rack has been moved into a brake applied position, and means for releasing said locking means to release said rack and permit the tension force in said brake cable to move said rack to its brake-released position.

2. The parking brake apply and release mechanism of claim 1 in which said housing has a bottom provided with an aperture through which said brake cable extends outwardly of said housing, and a force-absorbing bumper is provided between said rack and said housing bottom which receives force from said rack as said rack returns to its brake released position to receive said force in damping relation as said force is transmitted from said rack to said housing bottom.

3. The parking brake apply and release mechanism of claim 1 in which said pivotally movable operating arm is pivoted at its operative pivotal connection with said toothed rack so as to be substantially in line with said housing and said rack to create a unitary longitudinally slim mechanism package which occupies a minimum of dead space when shipping said mechanism as compared to the dead space which would be so occupied if the mechanism were to be shipped with the operating arm extending laterally relative to said housing and said rack.

4. The parking brake apply and release mechanism of claim 1 in which a parking brake switch having closed and open positions, one of which is said switch's default position and the other of which is said switch's other position;

said switch being selectively closed and opened for controlling the energization and deenergization of a parking brake applied and released signal, said switch being mounted in said housing and having a switch arm having a default position and an other position, said

22 switch arm being selectively movable from said switch arm default position to said switch arm other position to change said switch from said switch's default position to said switch's other position by operative engagement with and disengagement from said toothed rack, said switch arm being in said switch arm default position while said parking brake apply and release mechanism is in a parking brake apply condition so that said switch arm is operatively disengaged from said toothed rack and being operatively moved to said switch arm other position by operative engagement with said toothed rack when said toothed rack is returned to its parking brake release position from a parking brake apply position.

5. The parking brake apply and release mechanism of claim 4 in which said switch arm is engaged with a tooth of said toothed rack located substantially at the said toothed rack other end when said toothed rack is returned to its parking brake release position from a toothed rack parking brake apply position.

6. The parking brake apply and release mechanism of claim 4 in which said toothed rack has a generally U-shaped clevis pivotally attached to said toothed rack other end with said brake cable end being attached to said clevis, the operative engagement of said toothed rack with said switch arm being the engagement of said clevis with said switch arm.

7. The parking brake apply and release mechanism of claim 1 in which said locking means, when it locks and thereafter maintains said rack in a brake applied position, transmits all of the force reaction to the parking brake applying tension force exerted by said brake cable to said mounting bracket through said locking means and said housing so that all such force reaction completely bypasses said operating arm and its pivot.

8. The parking brake apply and release mechanism of claim 7 in which said locking and release mechanism includes a rotatable drum mounted in said housing and having thereon a pinion gear engaging said toothed rack in gear tooth meshing relation, a torsion spring clutch having a torsionally wound center portion received about said drum and normally gripping said drum and one spring clutch end fixed to said housing and its other spring end being free but movable in one arcuate direction so as to sufficiently unwind said center portion to release that portion's gripping action on said drum, and a release lever engageable with said spring free end, said release lever having a spring normally urging said lever in one arcuate direction wherein said release lever exerts no clutch releasing force on said spring clutch free end, said lever having means controlled by a vehicle operator selectively moving said release lever and said spring clutch free end against the torsion force of said spring clutch in said one arcuate direction and releasing said torsion spring clutch from said drum, said parking brake applying force in said brake cable then moving said rack into its brake released position, causing said gear and said drum to rotate to their brake released positions.

9. The parking brake apply and release mechanism of claim 7 in which said locking and release mechanism includes a pivotable pawl member pivotally mounted in said pivotal housing and having a pawl tooth selectively movable into and out of locking engagement with a tooth of said toothed rack so that while said pawl tooth is so engaged said toothed rack is prevented from moving in the parking brake release direction in said housing.

10. The parking brake apply and release mechanism of claim 9 in which said pawl member is moved by an overcenter spring having one end pivotally attached to said housing and the other end pivotally attached to said pawl member, said pawl tooth engaging a beveled end of said toothed rack formed on said toothed rack one end beyond the last tooth at that rack one end while said parking brake mechanism is in the parking brake released condition and being moved with linear movement of said toothed rack in the parking brake apply direction into ratcheting engagement with a series of one or more rack teeth as said rack continues to be moved in the parking brake apply position so that upon cessation of such movement and with little or no reverse rack movement said tooth is in locking engagement with said one tooth of said toothed rack as aforesaid, said pawl member having a cam surface of an end thereof beyond said pawl tooth from the pivot point of said pawl member on said housing and said toothed rack having an extension thereon provided with a tab which engages said cam surface as said toothed rack approaches its fully released position of the parking brake and said pawl tooth is located in a position to engage said beveled end of said toothed rack, pivotally camming said pivot member so that said pawl tooth is engaged with said rack beveled end, and in doing so causing said spring to move overcenter so as to condition said pawl member and said pawl tooth for another locking action when said parking brake operating mechanism is again operated to apply the parking brake.

11. A parking brake apply and release operating mechanism for a vehicle parking brake, said mechanism comprising:

a mounting bracket;

a pivotally movable operating arm having an arm pivot intermediately positioned thereon and about which said operating arm is selectively moved pivotally in either arcuate direction, said operating arm further having one arm end adapted for the application of parking brake applying force by a vehicle operator by pivotal movement of said operating arm about said arm pivot in one of said arcuate directions;

a housing mounted on said mounting bracket for pivotal movement and having guide means formed as a part of said housing;

a linearly extending toothed rack received in linearly slidable relation in and guided by said guide means, said toothed rack having oppositely disposed rack ends and rack teeth formed thereon between said rack ends;

said operating arm having another arm end opposite said one arm end operatively attached to one of said rack ends for transmitting parking brake apply force from said operating arm to said rack, said operating arm another arm end moving through an arc during pivotal movements of said operating arm and slidably moving said rack linearly in said housing guide means;

said housing pivoting on said mounting bracket commensurate with said operating arm one arm end arcuate movements so as to maintain linear alignment of said rack with said operating arm other arm end while accommodating the arcuate movements of said operating arm other arm end with a minimum of side load from said rack to said housing;

said rack having its said other end operatively connected to a brake cable adapted to be connected to operatively transmit parking brake application tension force to a vehicle parking brake when the brake applying force applied to said operating arm one arm end causes aforesaid linearly sliding movement of said rack in one linear direction relative to said guide means to apply parking brake applying tension to said brake cable;

means for locking said rack in a brake applied position when said rack has been moved into a brake applied position, and means for releasing said locking means to release said rack and permit the tension force in said brake cable to move said rack to its brake-released position;

said locking and release mechanism including a rotatable drum mounted in said housing and having thereon a pinion gear engaging at least one of said rack teeth in gear tooth meshing relation, a torsion spring clutch having spring clutch ends and a torsionally wound center portion received about said drum and normally gripping said drum, one of said spring clutch ends being fixed to said housing and the other of said spring clutch ends being free but movable in one arcuate direction so as to unwind said center portion to release that portion's gripping action on said drum, and a release lever engageable with said other spring clutch free end, said release lever having a spring normally urging said release lever in one arcuate direction of movement wherein said release lever exerts no clutch releasing force on said other spring clutch free end;

said release lever having means controlled by a vehicle operator selectively moving said release lever and said spring clutch free end against the torsion force of said spring clutch in said one arcuate direction and releasing said torsion spring clutch from said drum, said parking brake applying force in said brake cable then moving said toothed rack into its brake released position, causing said pinion gear and said drum to rotate to their brake released positions.

12. A parking brake apply and release operating mechanism for a vehicle parking brake, said mechanism comprising:

a mounting bracket;

a pivotally movable operating arm having an arm pivot intermediately positioned thereon and about which said operating arm is selectively moved pivotally in either arcuate direction, said operating arm further having one arm end adapted for the application of parking brake applying force by a vehicle operator by pivotal movement of said operating arm about said arm pivot in one of said arcuate directions;

a housing mounted on said mounting bracket for pivotal movement and having guide means formed as a part of said housing;

a linearly extending toothed rack received in linearly slidable relation in and guided by said guide means, said toothed rack having oppositely disposed rack ends and rack teeth formed thereon between said rack ends;

said operating arm having another arm end opposite said one arm end operatively attached to one of said rack ends for transmitting parking brake apply force from said operating arm to said rack, said operating arm another arm end moving through an arc during pivotal movements of said operating arm and slidably moving said rack linearly in said housing guide means;

said housing pivoting on said mounting bracket commensurate with said operating arm one arm end arcuate movements so as to maintain linear alignment of said rack with said operating arm other arm end while accommodating the arcuate movements of said operating arm other arm end with a minimum of side load from said rack to said housing;

said rack having its said other end operatively connected to a brake cable adapted to be connected to operatively transmit parking brake application tension force to a vehicle parking brake when the brake applying force applied to said operating arm one arm end causes aforesaid linearly sliding movement of said rack in one linear direction relative to said guide means to apply parking brake applying tension to said brake cable;

means for locking said rack in a brake applied position when said rack has been moved into a brake applied position, and means for releasing said locking means to release said rack and permit the tension force in said brake cable to move said rack to its brake-released position;

said locking and release mechanism including a pivotable pawl member having an elongated pivot-receiving aperture through which said pawl member is pivotally mounted in said pivotal housing and having a pawl tooth selectively moved into and out of locking engagement with a tooth of said toothed rack so that, while said pawl tooth is so engaged, said toothed rack is prevented from moving in the parking brake release direction in said housing, said pawl member when moved being movable by an overcenter spring having spring ends with one of said spring ends pivotally attached to said housing and the other of said spring ends pivotally attached to said pawl member, said pawl tooth engaging a beveled end of said toothed rack formed on said toothed rack one end beyond the last tooth at that rack one end and urged into such engagement by said overcenter spring while said parking brake mechanism is in the parking brake released condition and being moved with linear movement of said toothed rack in the parking brake apply direction into continued overcenter spring-urged ratcheting engagement with a series of one or more rack teeth as said rack continues to be moved in the parking brake apply position so that upon cessation of such movement and with little or no reverse rack movement said tooth is urged by the action of said overcenter spring into locking engagement with said one tooth of said toothed rack as aforesaid, said brake apply reaction force acting on said toothed rack and thence on said pawl tooth to move said pawl member laterally in a sliding manner on its pivot as permitted by its elongated pivot-receiving aperture, returning said overcenter spring overcenter and then urging but not moving said pawl tooth toward disengagement with said one tooth of said toothed rack and thereby being conditioned for release of said rack, said overcenter spring moving said pawl tooth outwardly from engagement with said one tooth of said toothed rack upon slight movement of said toothed rack in the parking brake apply direction by vehicle operator force applied to said operating arm so as to take up the brake apply force reaction force through said operating arm rather than said pawl member, said pawl member having a cam surface formed on an end thereof beyond said pawl tooth from the pivot point of said pawl member on said housing and said toothed rack having an extension thereon provided with a cam follower which engages said cam surface as said toothed rack approaches its fully released position of the parking brake and said pawl tooth is located in a position to engage said beveled end of said toothed rack, pivotally camming said pivot member so that said pawl tooth is engaged with said rack beveled end, and in doing so causing said pawl member to move said pawl member in a sliding manner on its pivot as permitted by its elongated pivot-receiving aperture in the opposite sliding direction from the above first-noted sliding movement, returning said overcenter spring overcenter so as to once again urge said pawl member in a pivotal direction wherein said pawl member and said pawl tooth are reset for another locking action when said parking brake operating mechanism is again operated to apply the parking brake.

13. In a parking brake operating mechanism having a parking brake apply operating arm operatively pivotally mounted on a fixed part of a vehicle and having first and second operating arm ends, a housing which is operatively pivotally mounted on a fixed part of the vehicle, a toothed member mounted for linear movements in said housing and being pivotally connected with said first end of said operating arm, a brake cable operatively connected with said operating arm, said brake cable being selectively subjected to parking brake apply force applied thereto in tension
  by arcuate movement of said first end of said operating arm causing movement of said toothed member in said housing
  and the application of the opposing parking brake applying reaction force from a parking brake mechanism being braked when said parking brake apply force is so applied, and means for selectively locking the toothed member to the housing:

an arrangement for selectively routing the braking apply tension force and the opposing braking apply reaction force exerted in the brake cable, said arrangement comprising:

(a) means active during parking brake apply
  for routing the braking apply force from said operating arm to said toothed member to said brake cable and
  for routing the braking apply reaction force reacting to the braking apply force
    from said brake cable through said toothed member to and through said first end of said operating arm
    to said second end of said operating arm to which vehicle operator parking brake apply force is being applied and
    to said operating arm pivot so as to be grounded to the fixed part of the vehicle on which said operating arm is pivotally mounted;

(b) means for engaging said locking means with said toothed member and locking said toothed member only against brake releasing movement caused by the braking apply force applied in tension to said brake cable; and (c) means for releasing the parking brake apply force being applied by the vehicle operator to said second end of said operating arm
  and transferring all of the braking apply reaction force opposing the braking apply tension force exerted in said brake cable from said toothed member
    to said locking means and thence to said pivotable housing
    and thence to the fixed part of the vehicle on which said pivotable housing is pivotally mounted,
    effectively bypassing said operating arm so that no braking apply reaction force is transmitted to said operating arm.

14. The parking brake operating mechanism arrangement of claim 13 further comprising:

means for releasing the braking apply reaction force in said toothed member and said locking means and said pivotable housing and the fixed part of the vehicle on which the housing is pivotally mounted
by releasing said locking means from locking engagement with said toothed member and releasing tension brake apply force in said brake cable.

15. The parking brake operating mechanism arrangement of claim 13 further comprising:

means for exerting a releasing force on said locking means urging the release of said locking means while the locking force exerted on said locking means by said toothed member is greater than said releasing force, effectively preventing such locking means release;

and means for releasing the braking apply reaction force in said toothed member and said locking means and said pivotable housing and the fixed part of the vehicle on which said housing is pivotally mounted
by releasing said locking means from locking engagement with said toothed member and releasing tension brake apply force in said brake cable.

16. The parking brake arrangement of claim 15 in which said means for exerting a releasing force on said locking means urging the release of said locking means while the locking force exerted on said locking means by said toothed member is greater than said releasing force so that said exerted locking force prevents such locking means release includes:

means for first reapplying braking apply force to said second end of said operating arm
and rerouting the braking apply reaction force being applied by said toothed member to said locking means away from said locking means and into said operating arm
at least to the extent that the locking force exerted on said locking means by said toothed member is no longer greater than said releasing force exerted on said locking means
and said locking means no longer prevents such locking means release, resulting in removal of said locking means from locking engagement with said toothed member, said means for exerting a releasing force on said locking means then holding said locking means in its released position
while said means for first reapplying brake apply force to said second end of said operating arm
is further actuated to remove said brake apply force first reapplied to said second end of said operating arm.

17. A complete parking brake apply and release mechanism in a vehicle, said complete mechanism comprising:

a first module including:

a housing containing a parking brake apply, locking and release mechanism, a front brake cable connected to a vehicle parking brake cable
which is in turn connected to at least one vehicle parking brake mechanism so as to actuate said at least one parking brake mechanism, said first module being selectively actuatable to apply a tension force to said front brake cable and thence through said vehicle parking brake cable
to actuate said vehicle parking brake mechanism
and to hold said tension force in said front brake cable and said vehicle parking brake cable
to maintain said vehicle parking brake mechanism actuated,
and to release said tension force in said front brake cable and said vehicle parking brake cable
to release said vehicle parking brake mechanism;

and a second module which includes a movable parking brake operating lever;

said complete parking brake apply and release mechanism being assembled in said vehicle by:
connecting said parking brake cable to said vehicle parking brake mechanism;
mounting said first module on a fixed mount in said vehicle in position to connect said front brake cable of said first module to said vehicle parking brake cable;
connecting said front brake cable and said vehicle parking brake cable for transmission of tension forces therethrough between said first module and said vehicle parking brake mechanism;
mounting said second module in said vehicle in position for said parking brake operating lever to be moved by a vehicle operator on a fixed mount in the vehicle for parking brake actuation and release;
and operatively connecting said second module parking brake operating lever to said apply, holding and release mechanism for operation of that mechanism as aforesaid.

18. The complete parking brake apply and release mechanism of claim 17 in which the mounting of said first module on a fixed mount in said vehicle includes a pivotal mounting thereof by which said first module is pivotally movable
at least in a plane to the extent required to continually provide a direct line of tension apply force
from said second module operative connection to said parking brake apply, holding and release mechanism
as said second module is moved from a parking brake released position to a parking brake apply position
and is moved from that parking brake apply position back to that parking brake released position.

* * * * *